(12) United States Patent
Mote et al.

(10) Patent No.: US 6,322,831 B1
(45) Date of Patent: Nov. 27, 2001

(54) BASKET LIFTING APPARATUS, BASKET LIFTING HINGE, AND BASKET LIFTING CONTROL METHOD

(75) Inventors: Ned M. Mote, Laura; William M. Casey; James D. King, both of Kettering; Gary L. Mercer, Eaton, all of OH (US)

(73) Assignee: Henny Penny Corporation, Eaton, OH (US)

( * ) Notice: Subject to any disclaimer, the term of this patent is extended or adjusted under 35 U.S.C. 154(b) by 0 days.

(21) Appl. No.: 09/670,713

(22) Filed: Sep. 28, 2000

Related U.S. Application Data

(60) Provisional application No. 60/156,450, filed on Sep. 28, 1999, and provisional application No. 60/128,214, filed on Apr. 7, 1999.

(51) Int. Cl.$^7$ ...................................... A47J 37/12
(52) U.S. Cl. ................. 426/231; 99/330; 99/336; 99/403; 99/407; 426/523; 426/438
(58) Field of Search ............... 99/326–336, 337, 99/338, 340, 403–418, 448, 485, 486, 468; 126/391; 426/231–233, 438, 520–523, 509–511

(56) References Cited

U.S. PATENT DOCUMENTS

| | | |
|---|---|---|
| 1,506,113 | 8/1924 | Dearing . |
| 1,551,869 | 9/1925 | Dearing . |
| 3,187,664 * | 6/1965 | Jennings ............................. 99/407 X |
| 3,242,849 | 3/1966 | Wells . |
| 3,273,488 | 9/1966 | Anetsberger . |
| 3,501,316 * | 3/1970 | Guthrie, Sr. ........................ 99/336 X |
| 3,563,158 * | 2/1971 | Omer ................................. 99/330 X |
| 3,608,473 * | 9/1971 | Kearn et al. ........................ 99/327 X |
| 3,635,722 * | 1/1972 | Moore ................................ 99/407 X |
| 3,690,246 * | 9/1972 | Guthrie, Sr. ........................ 99/410 X |
| 3,821,925 * | 7/1974 | Moore ................................ 99/407 X |
| 4,031,820 | 6/1977 | Reed . |
| 4,508,026 | 4/1985 | Anetsberger et al. . |
| 4,539,898 | 9/1985 | Bishop et al. . |
| 4,593,170 | 6/1986 | Maeda et al. . |
| 4,732,081 * | 3/1988 | Sakuma ................................ 99/407 |
| 4,785,725 * | 11/1988 | Tate et al. ............................ 99/336 |
| 4,852,471 * | 8/1989 | Lansing ................................ 99/336 |
| 4,898,091 * | 2/1990 | Rozak et al. ......................... 99/336 |
| 4,951,558 * | 8/1990 | Figliuzzi ............................... 99/336 |
| 4,997,101 * | 3/1991 | King et al. ........................... 220/318 |
| 5,097,752 | 3/1992 | Kung . |
| 5,142,968 | 9/1992 | Caron et al. . |
| 5,165,329 | 11/1992 | Jacob et al. . |
| 5,402,712 | 4/1995 | King et al. . |
| 5,469,778 | 11/1995 | Prudhomme . |
| 5,771,781 | 6/1998 | Sham . |
| 5,881,632 | 3/1999 | Fadoul . |

* cited by examiner

Primary Examiner—Timothy F. Simone
(74) Attorney, Agent, or Firm—Baker Botts L.L.P.

(57) ABSTRACT

The invention is a basket lifting apparatus having a supporting beam mounted substantially perpendicular and adjacent to an upper rear edge of a vat and a pair of supporting chamber extending perpendicular to the supporting beam and above and parallel to the upper rear edge of the vat. A motor is suspended from each of the supporting chambers, and a drive shaft from each motor extends into the associated supporting chamber. A jacking screw is rotatably mounted on and extends below each of the supporting chambers. A combination of gears and a drive chain transfers the rotational movement of the drive shaft to rotational movement of the jacking screw, and a shielding sleeve engages threads on the jacking screw, such that the sleeve is raised or lowered by the rotational movement of the jacking screw. Each sleeve includes a fixing pin or bolt for engaging a basket mounting hinge.

15 Claims, 24 Drawing Sheets

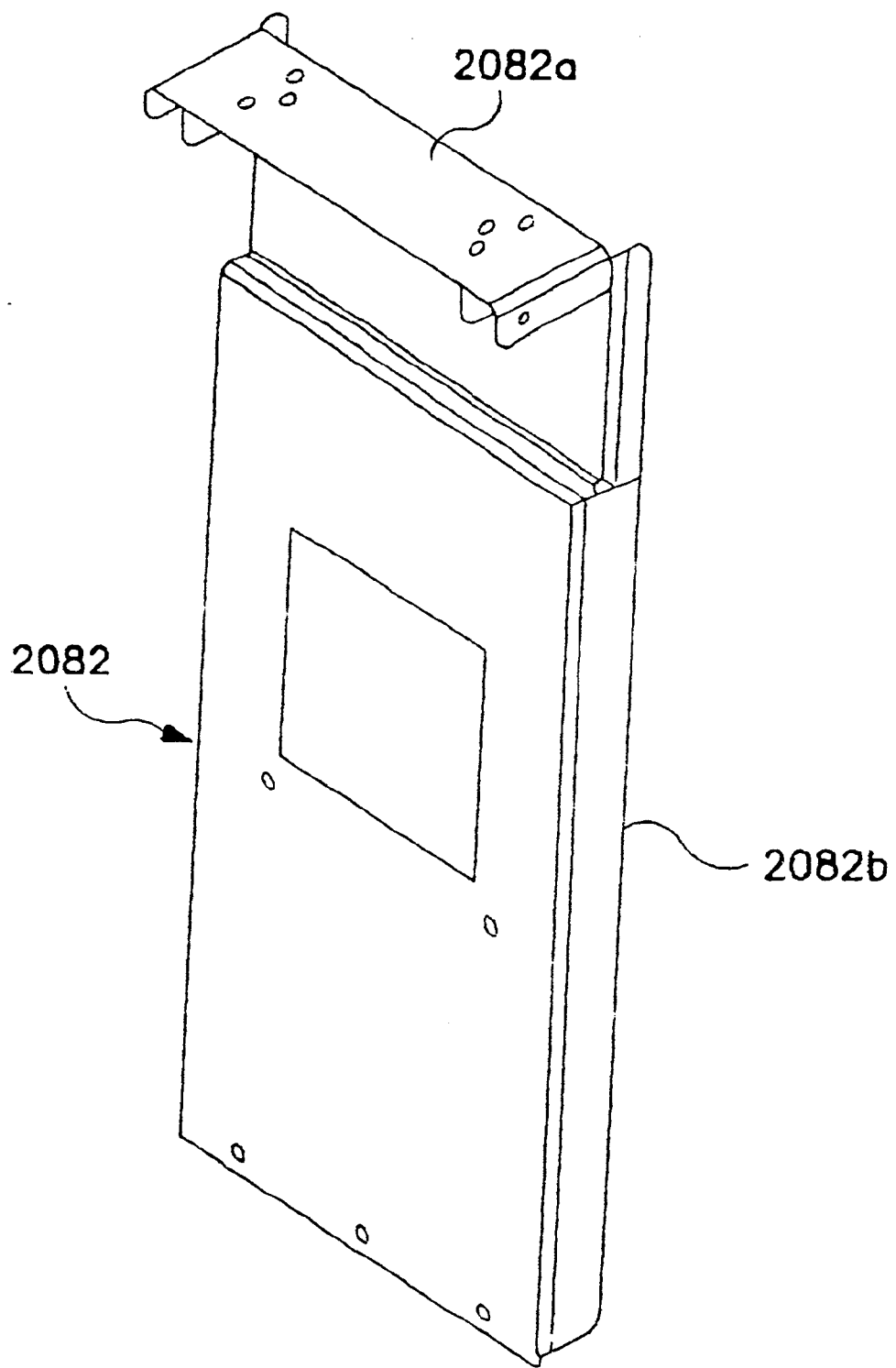
FIG. 20-I

BASKET LIFTING APPARATUS, BASKET LIFTING HINGE, AND BASKET LIFTING CONTROL METHOD

The present application claims priority from U.S. Provisional Patent Application No. 60/182,214, entitled "Basket Lifting Apparatus, Basket Lifting Hinge, and Basket Lifting Control Method," filed Apr. 7, 1999, and U.S. Provisional Patent Application No. 60/156,450, entitled "Basket Lifting Apparatus, Basket Lifting Hinge, and Basket Lifting Control Method," filed Sept. 28, 1999, which are incorporated herein by reference.

BACKGROUND OF THE INVENTION

1. Field of the Invention

The present invention relates to basket lifting apparatus, hinges for attaching a basket to such lifting apparatus, and methods for using such basket lifting apparatus while cooking. In particular, the invention relates to automatic basket lifting apparatus, which are positioned above cooking vats, such that the baskets may be raised and lowered without imparting undue torque to the motors or the lifting structure. Further the invention particularly relates to a method for cooking food products having different cook times in the same apparatus.

2. Description of Related Art

The use of deep-fry fryers for cooking food products is well known in commercial, institutional, and governmental food service operations. The cooking oils utilized in such deep-fat fryers are elevated in temperature to a point at which economical and efficient cooking times are achievable for preparing a variety of fried foods. When cooking chicken parts or other fried foods, in large quantities, in a commercial or institutional kitchen, the foods are frequently simply dropped inside the fryer into the hot oil. There is a heat exchange tube screen in the bottom of the fryer to prevent the food from coming in contact with the hot heat exchangers, which heats the oil. A basket may not be used because some foods, such as chicken parts, are allowed to float freely inside of the fryer to prevent the food from sticking together during cooking.

For example, as many as sixty (60) pieces of chicken may be dropped into the hot fryer oil at one time. This means that approximately twenty (20) to twenty-five (25) pounds of cooked chicken must be taken from the fryer after it is cooked. The current methods of removing the chicken, or other fried food, incorporates a hand held basket-type scoop which is used to scoop the food from the fryer oil.

A disadvantage experienced by the food service industry is exposure of cooks and other employees to the hot oil utilized in deep-fat fryers. The presence of such hot oil requires persons using such fryers to exercise great care in order to insure proper cooking of foods, but the oil, if spilled onto adjacent equipment or floor surfaces and not cleaned quickly, may create unsanitary conditions. The manual scooping of cooked foods from large fryers contributes to such conditions.

In smaller deep-fat fryers, employees may use baskets having elongated handles are used to retain the food being cooked. If not done properly, the use of manually lifted baskets, however, may also involve disadvantages. Even if the quantity of food being cooked is relatively small and, therefore, the weight of the food product not a significant factor, employees may be exposed to the hot cooking substance and the possible spattering of the cooking substance when a fryer basket is lowered or raised into the oil. Also, as with large fryers, foods may inadvertently be overcooked when reliance is placed on manual removal of the cooking a basket from a fryer.

As previously mentioned, a disadvantage experienced by the food services industry, which is directly related to the preparation of deep-fat fried foods, is the difficulty in maintaining a consistency of quality in the prepared product. In order to overcome this problem, controls have previously been designed for monitoring the temperature of the cooking oil and the cooking time for deep-fat fryers depending upon the quantity and type of food which is being cooked. In this respect, it may be desirable to make the cooking process as automated as possible and to reduce the possibility of human error, such as in either removing a product from a cooking oil before it is fully cooked or in leaving the product in the cooking oil to a point at which the product is overcooked. There is great diversity in the cooking time or cycle of products immersed in cooking oil. In those instances in which the product must be manually lowered or manually raised from the cooking oil, not only does the time of immersion vary from the time of introduction of the food product, but the response time of an individual raising the product from the cooking oil also varies greatly.

Some known lid raising and lowering mechanisms require powerful power train means. Moreover, some position the lid actuating mechanism at the sides or about the vat making access to the vat and cleaning operations more difficult. Electro-mechanical or hydraulic systems used for this purpose have suffered from maintenance problems and attendant downtime. As a result, efforts to mechanize the operation of deep fat fryers by means of electromechanical or hydraulic controls for raising and lowering the lids of the vats or raising or lowering baskets have encountered numerous problems.

SUMMARY OF THE INVENTION

In view of the foregoing, there is a need to provide a safer and more reliable manner in which to manipulate foods being introduced into and being removed from deep-fat fryers. Further, there is a need to provide for the automated handling of bulk foods being cooked in deep-fat fryers to ensure quality control of such foods.

Consequently, a need has arisen for an automatic basket lifting apparatus for rising and lowering baskets of food products into a vat of a deep fat fryer. A further need has arisen for a automatic basket lifting apparatus, which is configured and positioned to avoid the adverse effects of excessive torque on the lifting motor and the lifting structure, eg., the structure supporting the motor and jacking screw. Still another need has arisen for a hinge for use with a basket lifting apparatus, which secures the basket during raising and lowering, facilitates insertion and removal of the basket, and positions the basket properly over a slanted portion of a vat edge. Yet another need has arisen for a method of cooking two food products having similar temperature requirements for the cooking medium during their cooking cycles.

An embodiment of this invention includes a basket mounting hinge. Such a hinge may comprise a rectangular backing plate having first and second opposing surfaces and a deflecting lip formed on a first edge of the backing plate and extending from the first opposing surface. A basket receiving bracket may have a first portion fixed to and extending from the first opposing surface and a second portion extending substantially parallel to the first opposing surface. The second portion may be adapted to receive one end of a basket and to support a basket. At least one mounting means, e.g., a hole suitable for receiving a bolt, a screw, or a locking pin, is positioned proximate to a second edge of the backing plate for fixing the hinge to a basket lifting apparatus. A pair of wheels may each be affixed on an axle mounted parallel to the first opposing surface, such that the wheels extend beyond and substantially perpendicular to the second opposing surface. Both wheels may be fixed to a single axle or each may be affixed to its own axle.

A further embodiment of this invention includes a basket mounting hinge. Such a hinge may comprise a rectangular backing plate having first and second opposing surfaces, a tapered extension, and a deflecting lip. The deflecting lip is formed on a first edge of the backing plate and extending from the first opposing surface. A basket receiving bracket may have a first portion fixed to and extending from the first opposing surface and a second tapering portion extending substantially parallel to the first opposing surface. The second tapering portion may be adapted to receive one end of a basket and to support a basket. The tapering extension is formed on a second edge, and at least one mounting means, e.g., a U-shaped bracket suitable for receiving a bolt, a screw, or a locking pin, is positioned proximate to a narrowest portion of the tapering extension for fixing the hinge to a basket lifting apparatus. A pair of wheels may each be affixed on an axle mounted parallel to the first opposing surface, such that the wheels extend beyond and substantially perpendicular to the second opposing surface. Both wheels may be fixed to a single axle or each may be affixed to its own axle.

In another embodiment of the invention, a basket mounting hinge may comprising a pair of angled, substantially parallel hinge brackets forming an angled bracket portion and a vertical bracket portion. Each of the brackets may have a securing means, es, loops for receiving a locking pin or a nut and bolt, at a first bracket end for fixing the hinge to a basket lifting apparatus. A bracket joining plate may have first and second opposing surfaces and may subtend the angle of the brackets to form an angled plate portion and a vertical plate portion, and a deflecting lip fixed to a second bracket end of each of the brackets and extending between the brackets. A basket receiving bracket may have a first portion fixed to and extending from the first opposing surface of the vertical plate portion and a second portion extending substantially parallel to the first opposing surface of the vertical plate portion, such that this second portion is adapted to receive one end of a basket and to support a basket.

In still another embodiment, the invention is a basket lifting apparatus having a supporting beam mounted substantially perpendicular and adjacent to an upper rear edge of a vat and at least one supporting chamber extending perpendicular to the supporting beam and above and parallel to the upper rear edge of the vat. A motor is suspended from each of the at least one supporting chambers, and a drive shaft from each motor extends into the associated supporting chamber. A jacking screw is rotatably mounted on and extends below each of the supporting chambers. Drive means, e.g., a combination of gears or of gears and a drive chain, or the like, transfers the rotational movement of the drive shaft to rotational movement of the jacking screw, and a shielding sleeve engages threads on the jacking screw, such that the sleeve is raised or lowered by the rotational movement of the jacking screw. Each sleeve may include a fixing pin or bolt, or the like, for engaging a basket mounting hinge.

In yet another embodiment, the invention also includes a method for controlling an automatic basket lifting apparatus.

The method includes the steps of selecting a first food product having a first cooking time and a second food product having a second cooking time, wherein the first cooking time is greater than the second cooking time; and determining a cooking time differential between the first cooking time and the second cooking time. A basket containing the first food product then may be lowered into a cooking medium, and the food product may be cooked for the cooking time differential. The basket may be raised, and the second food product then may be added to the basket. The basket containing the first and second food products then is again lowered into a cooking medium, and the first and second food products are cooked for the second cooking time. Subsequently, the basket is raised, and the first and second food products are removed.

Other objects, features, and advantages will be understood by persons skilled in the art from the following detailed description of preferred embodiments of the present invention, in view of the accompanying figures.

BRIEF DESCRIPTION OF THE DRAWINGS

Embodiments of the invention are described below with reference to the accompanying figures, which are provided by way of example only, and are not intended to limit the present invention.

FIGS. 19-1, 19-2, and 19-3 depict three views of the motor for the embodiment of FIG. 15, where FIG. 19-1 is a perspective view of the motor; where FIG. 19-2 is a front view of the motor; and where FIG. 19-3 is a right side view of the motor.

FIGS. 20-1, 20-2, 20-3, and 20-4 depict four views of the motor mounting bracket of the embodiment of FIG. 15, where FIG. 20-1 is a perspective view of the motor mounting bracket; where FIG. 20-2 is a right side view of the motor mounting bracket; where FIG. 20-3 is a front view of the motor mounting bracket; and where FIG. 20-4 is a top view of the motor mounting bracket.

DETAILED DESCRIPTION OF PREFERRED EMBODIMENTS

Figure 1:
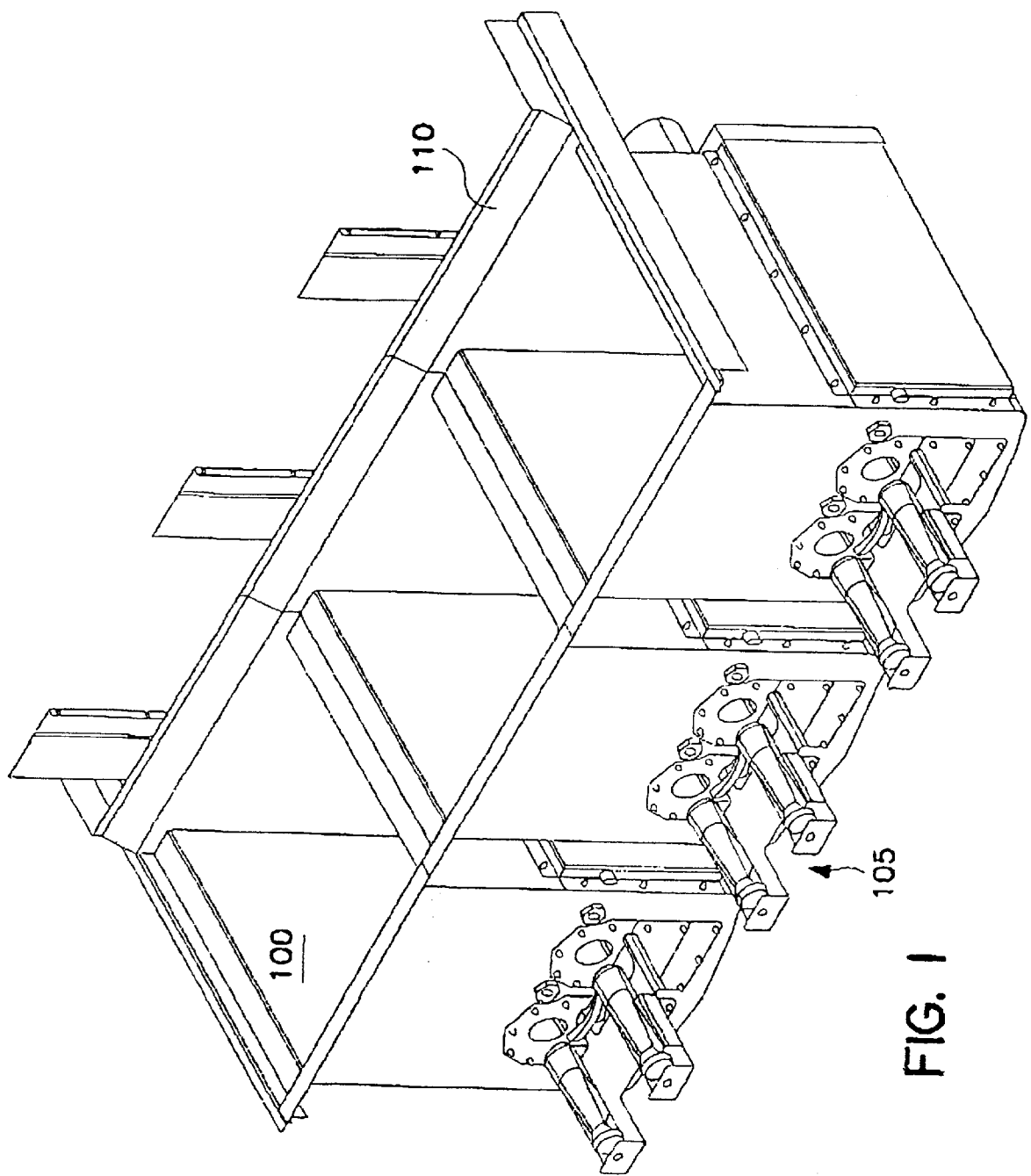
FIG. 1 depicts a perspective, front view of the vats and burner assemblies of a three well fryer.

Embodiments of the present invention and their technical advantages may be better understood by referring to FIGS. 1 though 20-4.

Referring to FIG. 1, a perspective, front view of the vats 100 and burner assemblies 105 of a known three well fryer is provided. The upper rear edge of the vat 110 is further identified.

Figure 2:
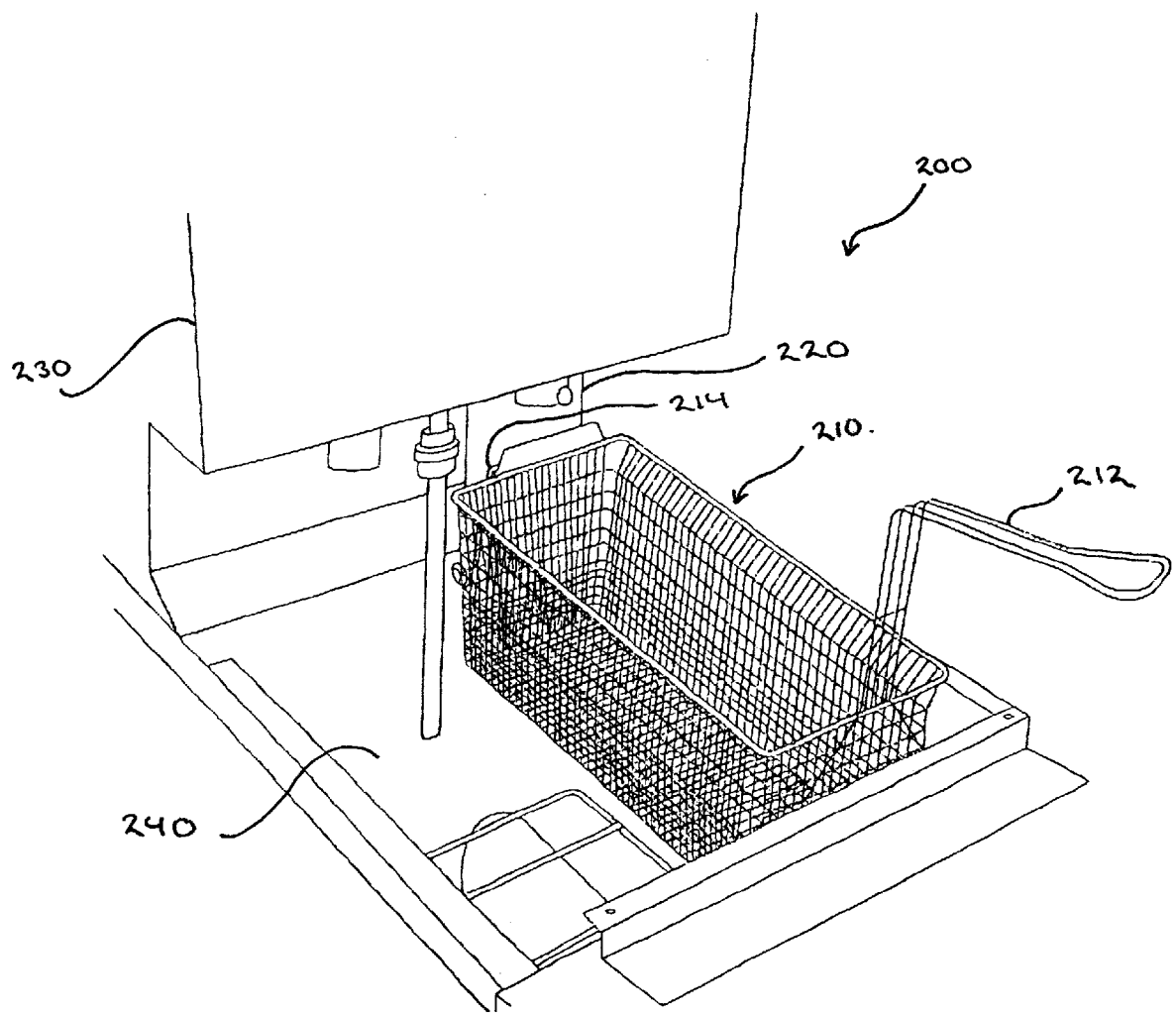
FIG. 2 is a perspective view of a one-well fryer with a basket mounted on a basket mounting hinge. The basket lifting apparatus is shielded by a sheet metal enclosure.

FIGS. 2-8 depict a basket mounting hinge according to a first embodiment of the present invention. Referring to FIGS. 2, 3, 5, and 8, views of a one-well fryer with a basket mounted on a basket mounting hinge are provided FIG. 2 is a perspective view of a one-well fryer 200 with a basket 210 mounted on a basket mounting hinge 220. Basket 210 is equipped with a handle 212 and a grasping loop 214. Grasping loop 214 engages hinge 220. The basket lifting apparatus is shielded by a sheet metal enclosure 230. Note that two baskets 210 may fit in a well or vat 240 of fryer 200 shown in the figure.

Figure 3:
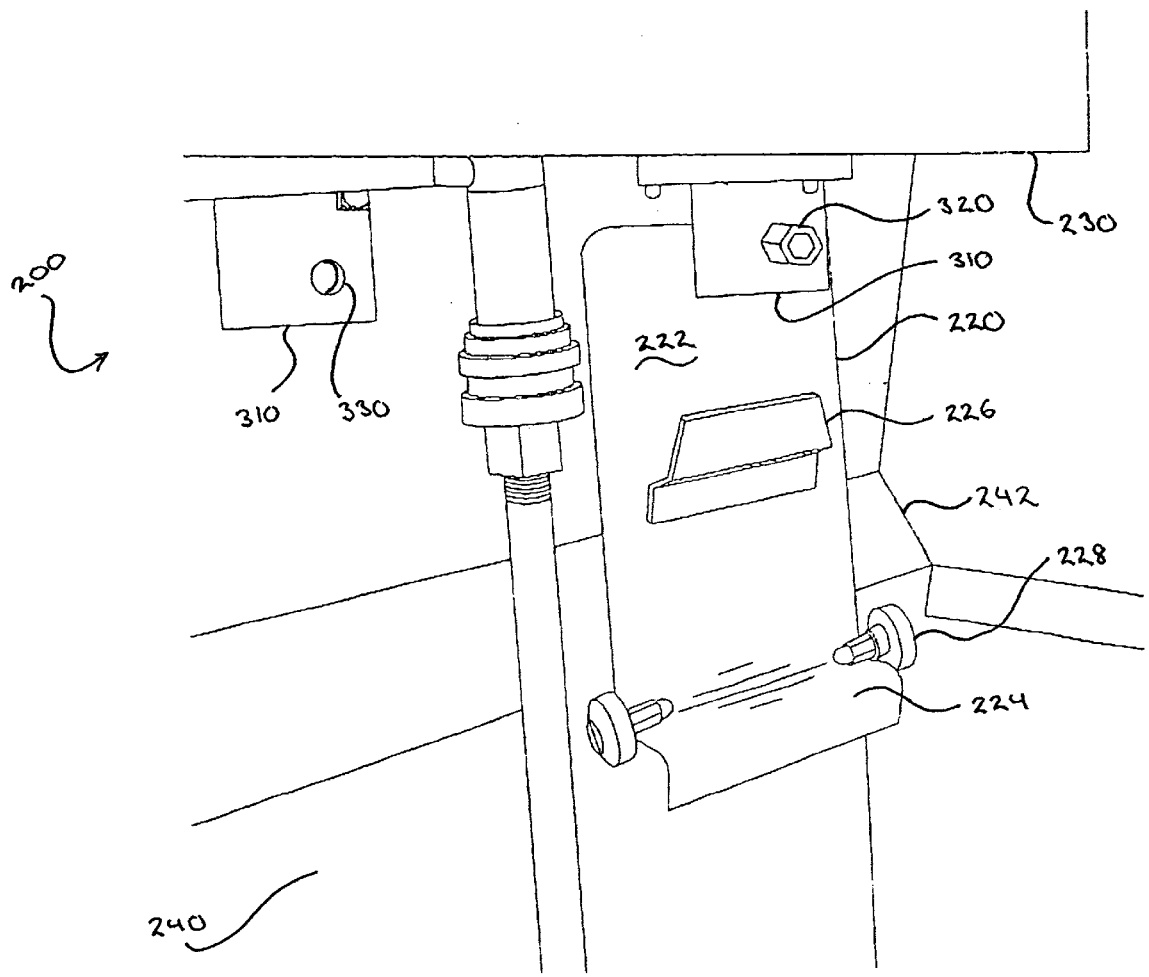
FIG. 3 is a perspective view of an embodiment of the basket mounting hinge attached to the basket lifting apparatus of FIG. 2.

FIG. 3 is a perspective view of an embodiment of the basket mounting hinge 220 attached to the basket lifting apparatus of FIG. 2. Basket hinge connecting tubes 310, which form a portion of the basket lifting apparatus, are visible extending below sheet metal enclosure 230 of fryer 200. Basket mounting hinge 220 includes a backing plate 222. A deflecting lip 224 is formed on a first opposing surface of backing plate 222, and extends from that surface. A basket receiving bracket 226 extending from the same surface as deflecting lip 224.

At least one hole (not shown) may be provided through backing plate 222. A nut and bolt 320 may be inserted through a passage 330 formed through connecting tube 310 to secure hinge 220 to connecting tube 310.

A pair of wheels 228 also may be provided. Wheels 228 may extend beyond and substantially perpendicular to backing plate 222. Wheels 228 may be secured to backing plate 222 with screws, such screws may function as axles for wheels 228. As the basket lifting apparatus raises and lowers a basket (not shown), wheels 228 may ride on the rear wall of vat 240.

Figure 4:
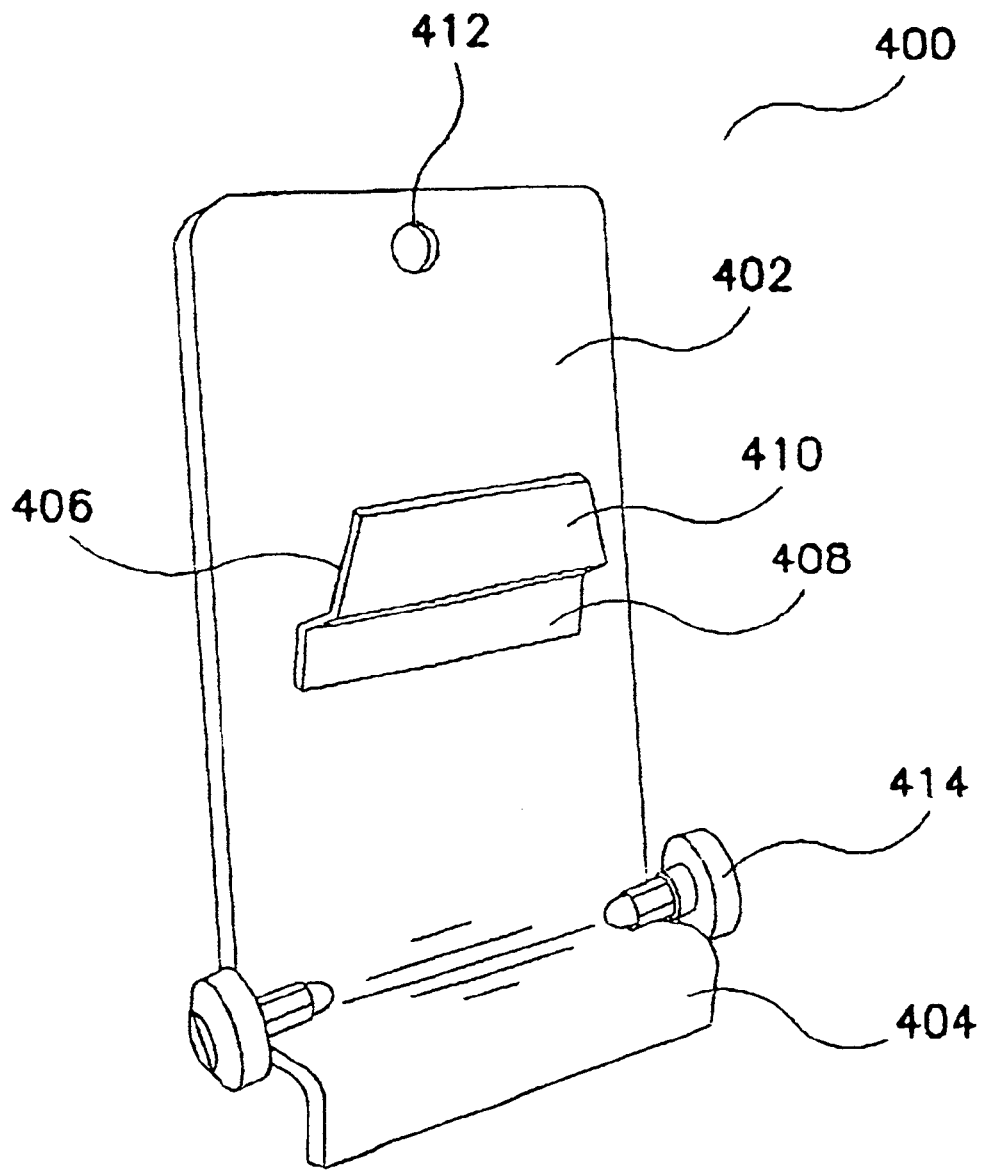
FIG. 4 depicts perspective view of the embodiment of the basket mounting hinge, such as that attached to the basket lifting apparatus of FIG. 3
Figure 6:
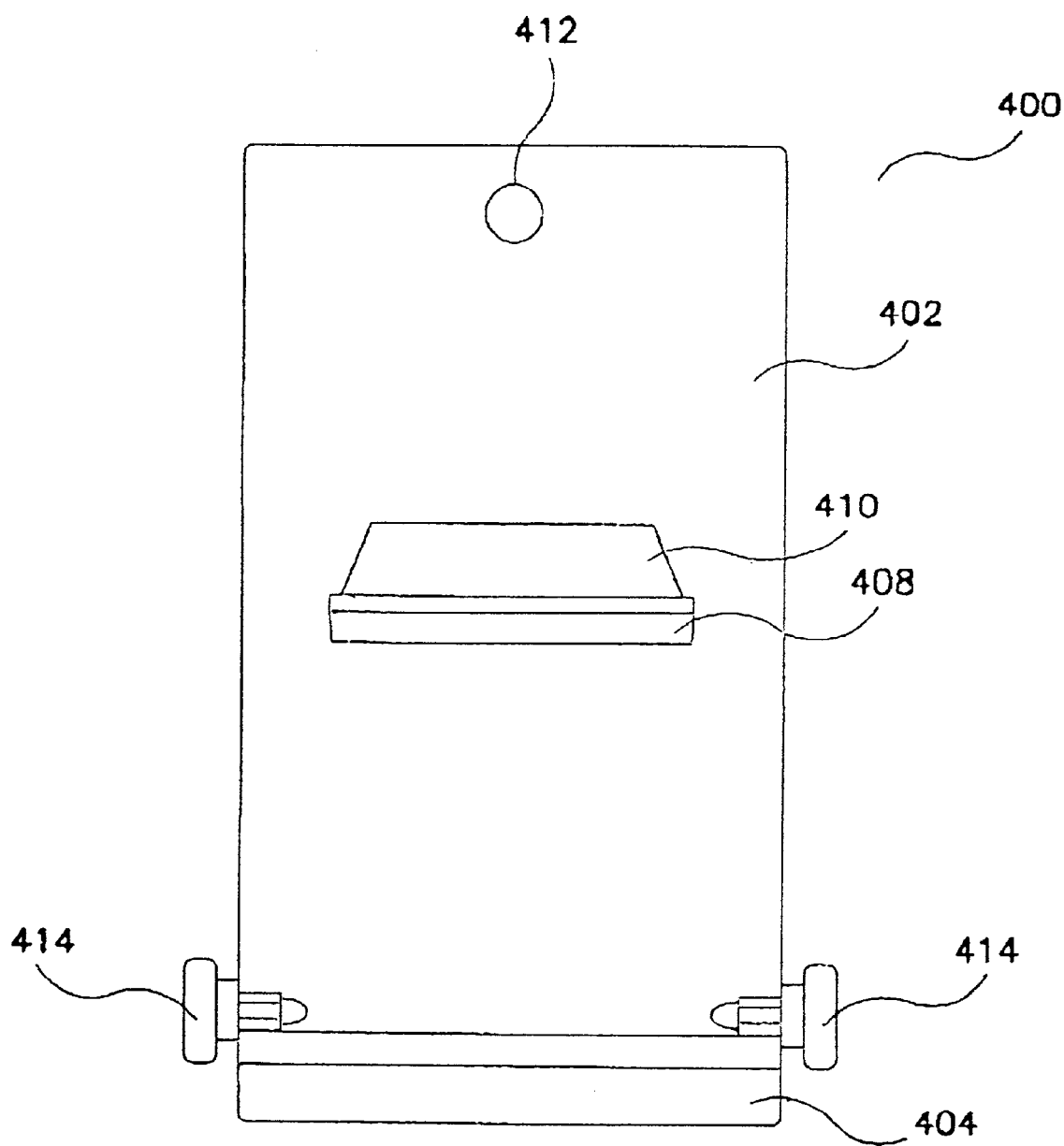
FIG. 6 depicts a plan view of the embodiment of the basket mounting hinge of FIG. 4.
Figure 7:
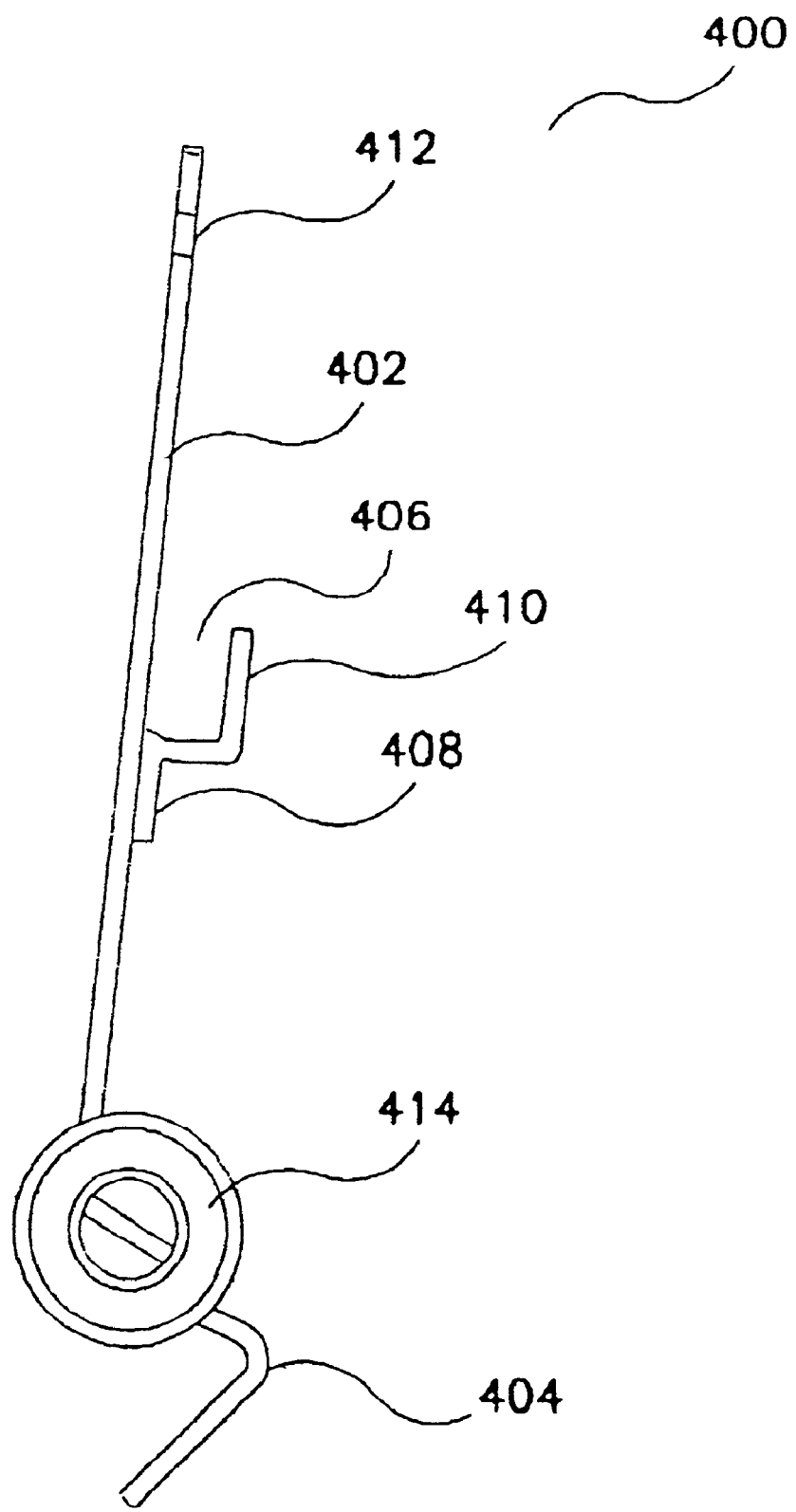
FIG. 7 depicts a side view of the embodiment of the basket mounting hinge of FIG. 4.

Referring to FIGS. 4, 6, and 7, basket mounting hinge 400 including rectangular backing plate 402 is described in greater detail. Deflecting lip 404 is formed on a first opposing surface of backing plate 402, and extends from that surface.

Basket receiving bracket 406 is provided. Basket receiving bracket 406 has first portion 408 fixed to and extending from the same surface as deflecting lip 404, and second portion 410 extending substantially parallel to said surface. Second portion 410 may be adapted to receive one end of a basket, e.g., a metal loop or bar affixed to the basket, and to support a basket.

At least one mounting means 412 may be provided on rectangular backing plate 402. In an embodiment of the present invention, mounting means 412 may be a hole through which a bolt (not shown) is inserted or a metal screw is threaded.

A pair of wheels 414 also may be provided. Wheels 414 may extend beyond and substantially perpendicular to the second opposing surface of the rectangular backing plate 402. Wheels 414 may be secured to rectangular backing plate 402 with screws, such screws may function as axles for wheels 414.

Figure 5:
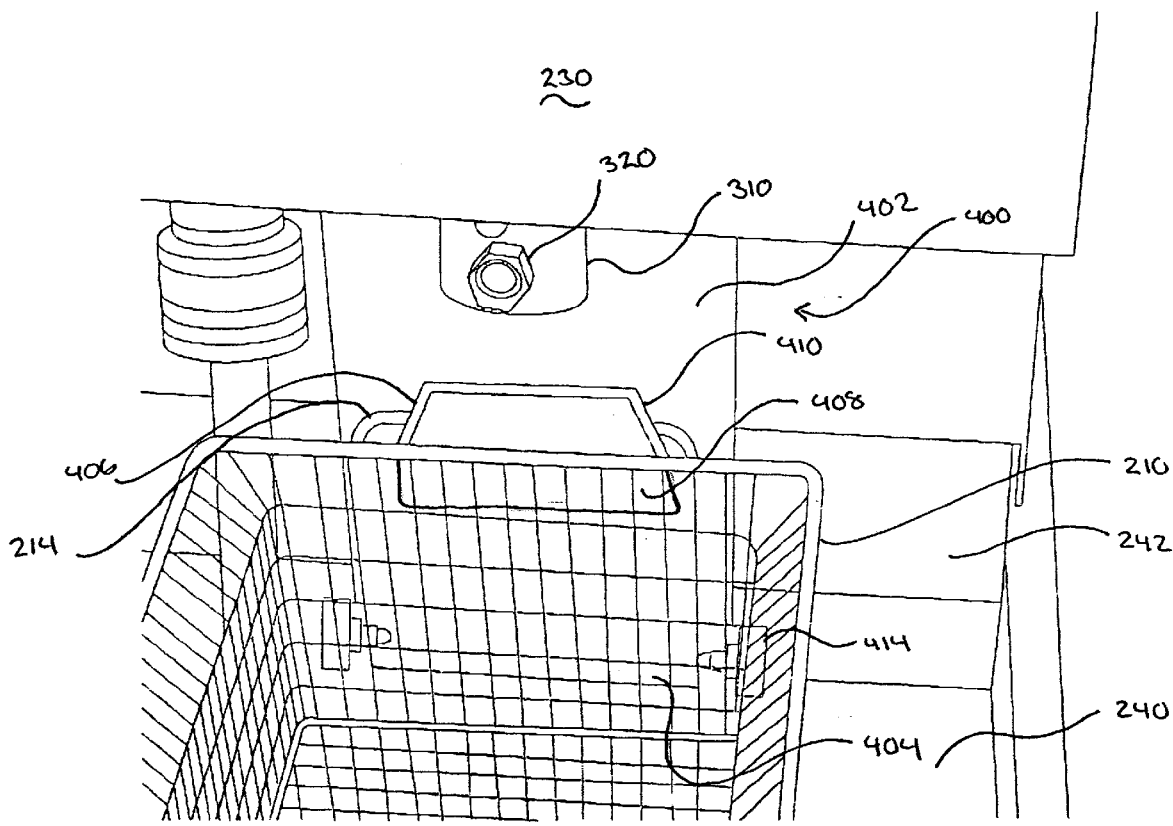
FIG. 5 depicts an elevated, front, perspective view of the embodiment of the basket mounting hinge attached to the basket lifting apparatus.
Figure 8:
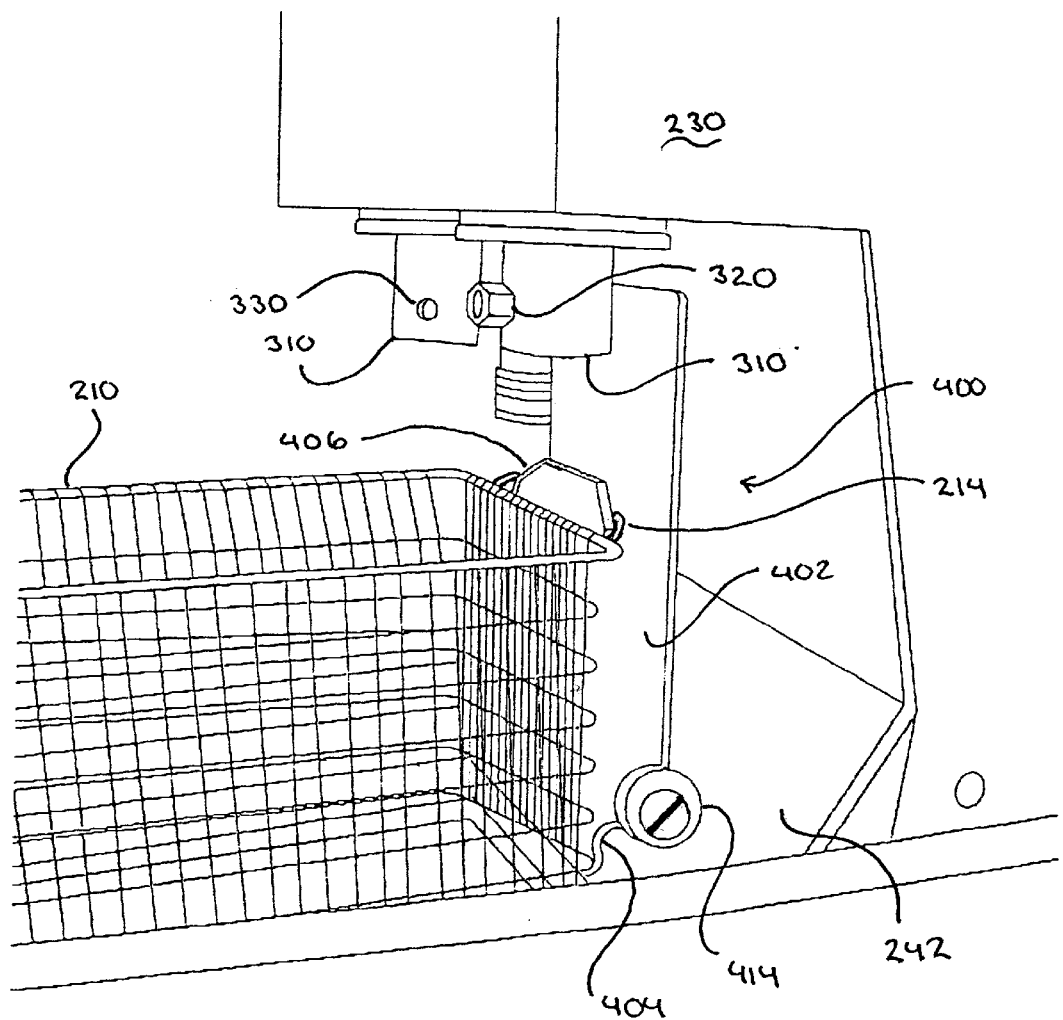
FIG. 8 depicts a side view of the embodiment of the basket mounting hinge mounted of the lifting apparatus.

FIGS. 5 and 8 further illustrate the features of basket lifting hinge 400 from a plurality of angles and in different views. FIG. 5 depicts an elevated, front, perspective view of the embodiment of the basket mounting hinge 400 attached to the basket lifting apparatus (not shown). Similarly, FIG. 8 depicts a side view of the embodiment of basket mounting hinge 400 mounted on the lifting apparatus.

Basket hinge connecting tubes 310, which form a portion of the basket lifting apparatus, are visible extending below sheet metal enclosure 230 of fryer 200. Basket mounting hinge 400 includes a backing plate 402. Deflecting lip 404 is formed on a first opposing surface of backing plate 402, and extends from that surface. As noted above, basket receiving bracket 406 has first portion 408 fixed to and extending from the same surface as deflecting lip 404, and second portion 410 extending substantially parallel to said the surface.

As noted above, basket 210 may include grasping loop 214. Grasping loop 214 may be adapted to receive basket receiving bracket 406. When receiving bracket 406 is received within grasping loop 214, basket 210 may pivot to rest against deflecting lip 404.

At least one hole (not shown) may be provided through backing plate 402. Nut and bolt 320 may be inserted through passage 330 formed through connecting tube 310 to secure hinge 220 to connecting tube 310. A pair of wheels 414 also may be provided. Wheels 414 may extend beyond and substantially perpendicular to backing plate 402. Wheels 414 may be secured to backing plate 222 with screws, such screws may function as axles for wheels 414. As the basket lifting apparatus raises and lowers basket 210, wheels 414 may ride on the rear wall of vat 240.

Figure 9:
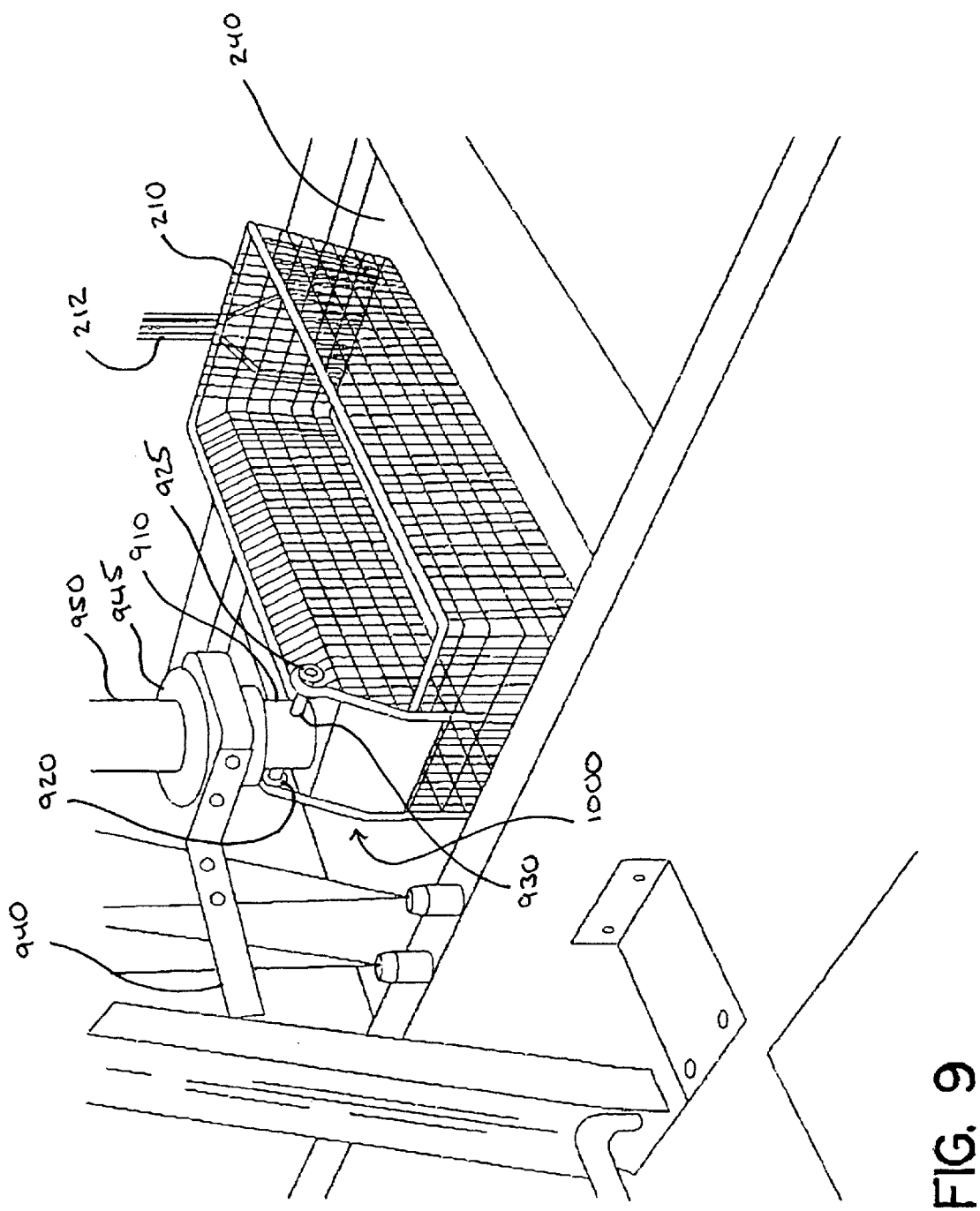
FIG. 9 depicts a rear view of the basket lifting apparatus without the protective metal enclosure. Another embodiment of the basket mounting hinge is depicted in this view.
Figure 10:
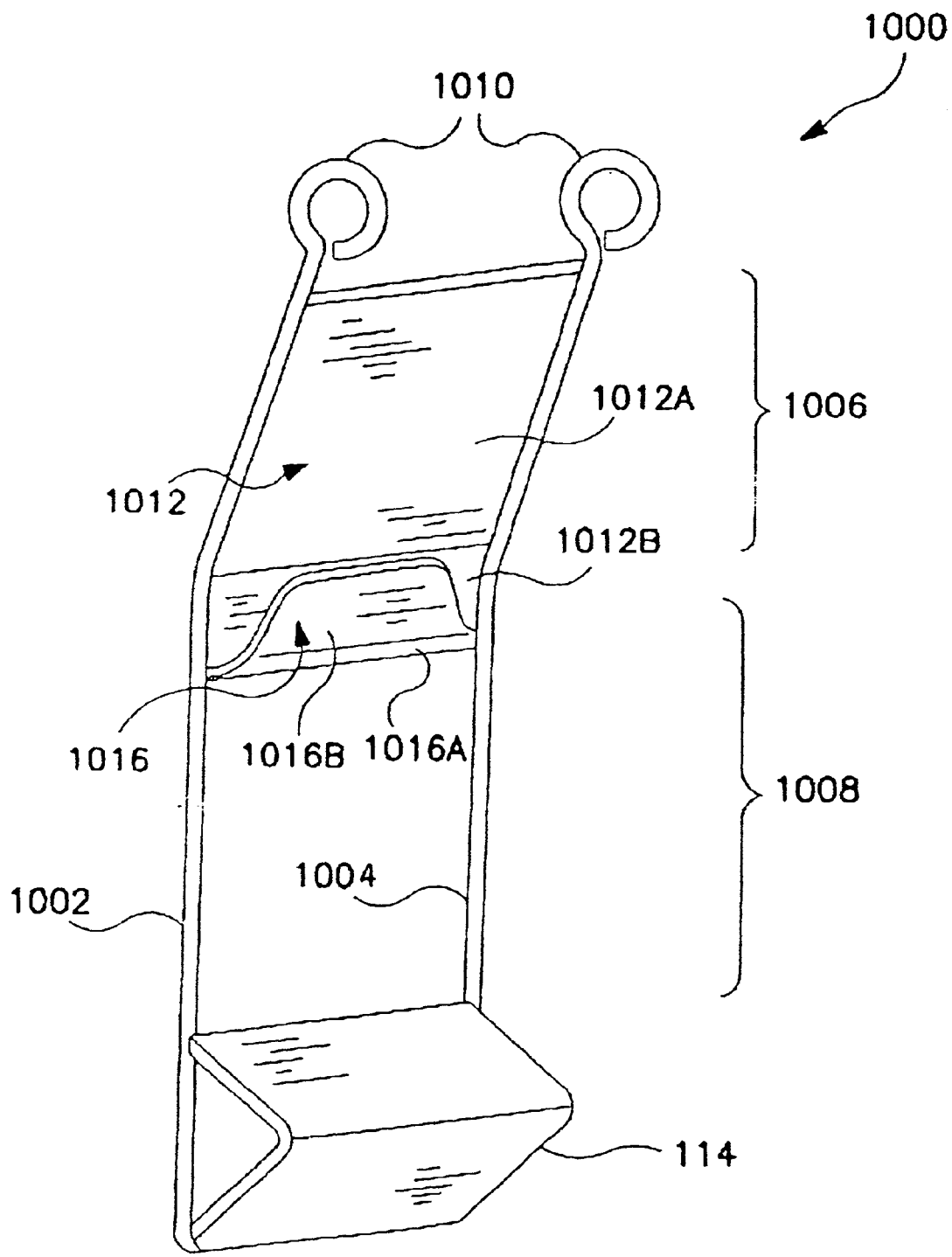
FIG. 10 depicts a perspective view of another embodiment of the basket mounting hinge is depicted FIG. 9.
Figure 11:
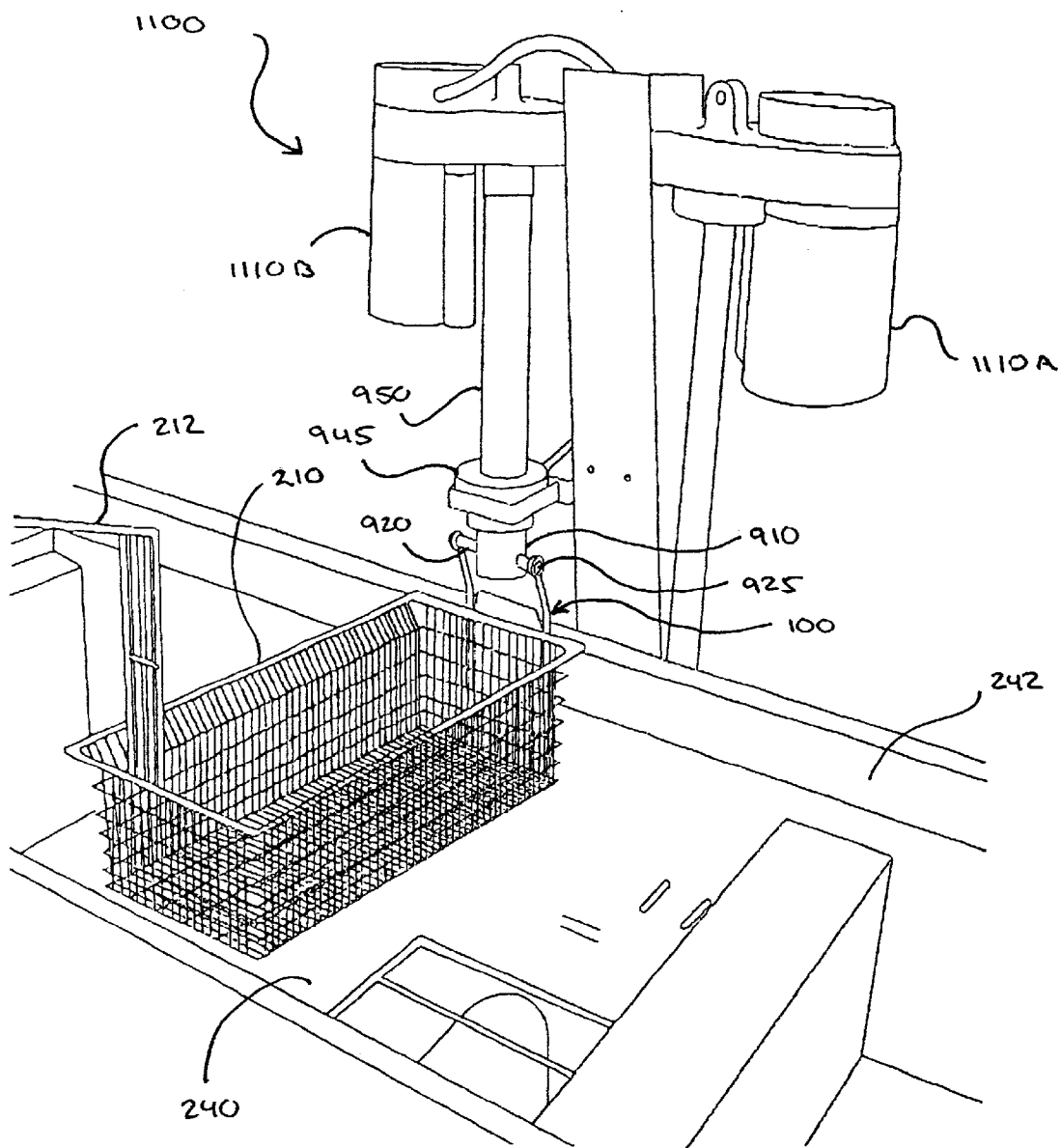
FIG. 11 depicts a elevated, front, perspective view of the basket lifting apparatus.

FIGS. 9–13 depict a basket mounting hinge according to another embodiment of the present invention. Referring to FIGS. 9 and 11, views of a fryer with a basket mounted on a basket mounting hinge are provided. FIG. 9 depicts a rear view of the basket lifting apparatus without protective metal enclosure 230. Basket 210 has basket handle 212 at one end and the opposite end is mounted on the basket lifting apparatus by a basket mounting hinge 1000. Because protective metal enclosure 230 has been removed, a basket hinge connecting tube 910 and a shielding sleeve 950. Sleeve 950 and connecting tube 910 are secured by a securing arm 940 and a securing ring 945. Basket hinge mounting 1000 is mounted on connecting tube 910 by a securing pin 920 that passes through a passage 930 formed in connecting tube 910. Pin caps 925 secure hinge 1000 on pin 920. Hinge 1000, which is described in detail in FIG. 10, is another embodiment of the basket mounting hinge.

This additional embodiment of the basket mounting hinge is more clearly shown in FIG. 10. In this figure, basket mounting hinge 1000 includes a pair of angled, substantially parallel, hinge brackets 1002 and 1004 forming an angled bracket portion 1006 and a vertical bracket portion 1008. Each of the brackets 1002 and 1004 has a securing means 1010 at a first bracket end for fixing the hinge 1000 to a basket lifting apparatus, e.g., by means of a securing bolt or locking pin.

Bracket joining plate 1012 has first and second opposing surfaces, and plate 1012 may form an angled plate portion 1012A and a vertical plate portion 1012B. Deflecting lip 1014 fixed to a second bracket of the brackets and extending between may be provided. Deflecting lip 1014 may have a "V" shape, as shown in FIG. 10, or it may have another suitable shape.

Basket receiving bracket 1016 is provided on bracket joining plate 1012. Basket receiving bracket 1016 may have a first portion 1016A fixed to and extending from vertical plate portion 1012B, and a second portion 1016B extending substantially parallel to the vertical plate portion 1012B of bracket joining plate 1012. The second portion 1016B of basket receiving bracket 1016 is adapted to receive one end of a basket and to support a basket, e.g., a metal loop or bar affixed to the basket, and to support a basket.

According to one embodiment of the present invention, securing means 1010 may be a loop for receiving a securing pin (not shown). Securing pin 920 may be inserted through securing means 1010, securing basket mounting hinge 1000 to a basket lifting apparatus, shown in FIGS. 9 and 11. FIG. 11 depicts a elevated, front, perspective view of a basket lifting apparatus 1100. Basket 210 has basket handle 212 at one end and the opposite end is mounted on the basket lifting apparatus by a basket mounting hinge 1000. Because protective metal enclosure 230 has been removed, a basket hinge connecting tube 910 and a shielding sleeve 950. Sleeve 950 and connecting tube 910 are secured by a securing arm 940 and a securing ring 945. Basket hinge mounting 1000 is mounted on connecting tube 910 by a pin 920 that passes through a passage 930 formed in connecting tube 910. Pin caps 925 secure hinge 1000 on pin 920.

Lifting apparatus 1100 includes motors 1110A and 1110B, which may be electrical motors. A jacking screw assembly (not shown) is housed within sleeve 950 and is driven by motor 1110B. The jacking screw assembly in conjunction with sleeve 950 and connecting tube 910 are used to raise and lower basket 210.

Figure 12:
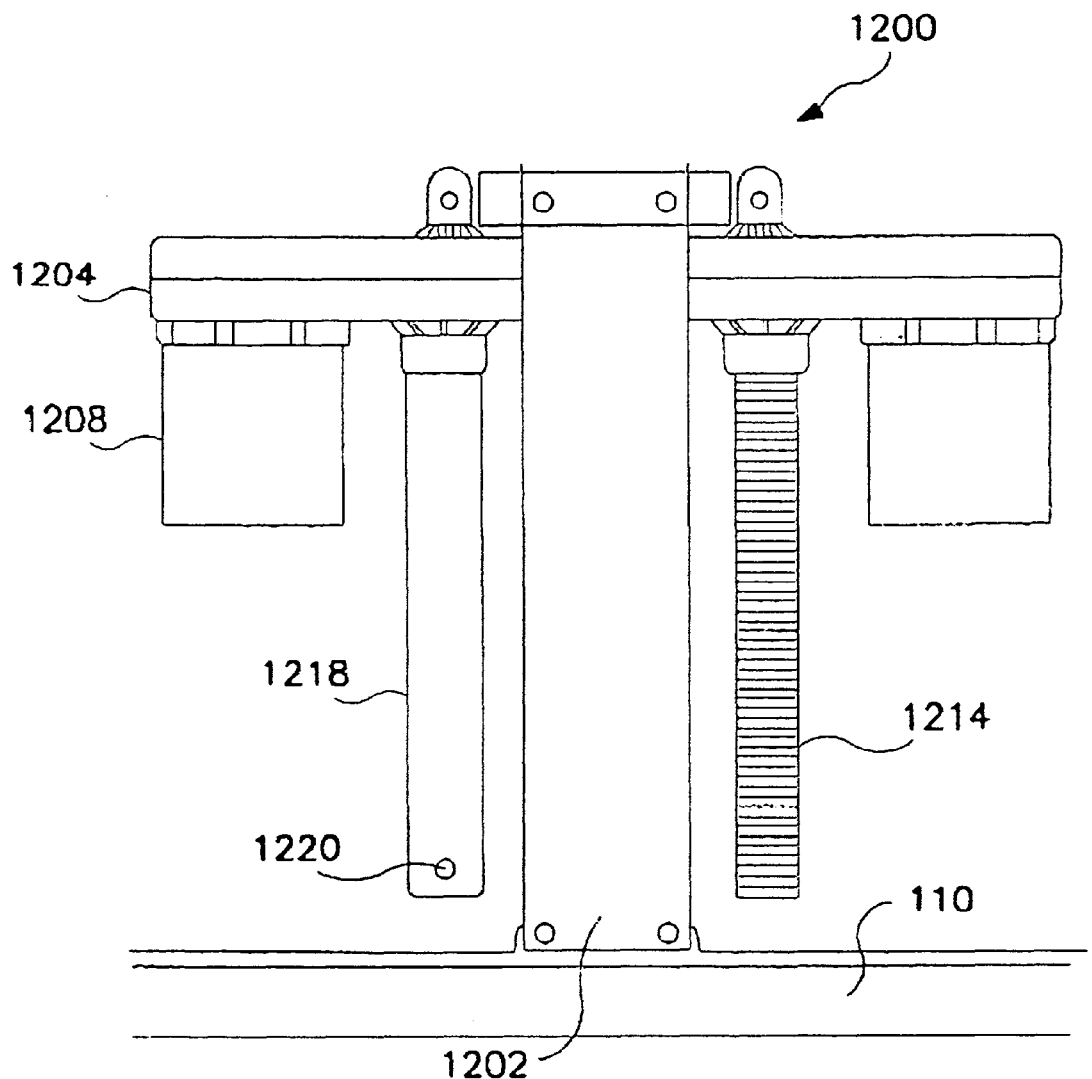
FIG. 12 depicts a front view of the basket lifting apparatus with one jacking screw exposed and one shielding sleeve in the raised position.
Figure 13:
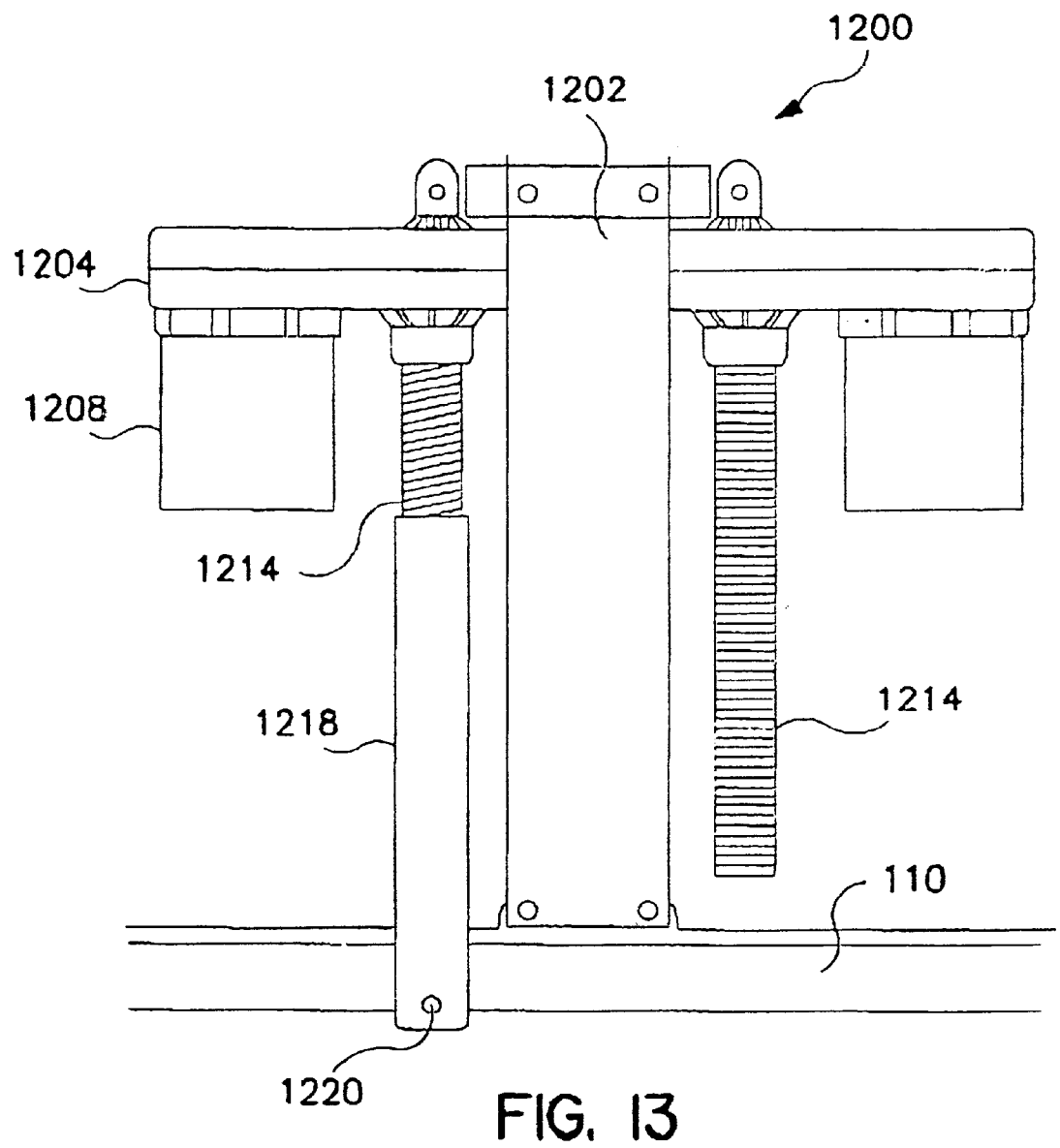
FIG. 13 depicts a front view of the basket lifting apparatus with one jacking screw exposed and one shielding sleeve in the lowered position.

According to another embodiment of the present invention, a basket lifting apparatus is provided. This may be seen in FIGS. 11–14. Referring specifically to FIG. 12, according to one embodiment of the present invention, basket lifting apparatus 1200 includes supporting beam 1202, which may be mounted substantially perpendicular and adjacent to an upper rear edge 110 of the cooking vat 100, as seen in FIG. 1. At least one supporting chamber 1204, which extends perpendicular to supporting beam 1202 and above and parallel to the upper rear edge 110 of the vat serves to support a motor 1208 and a jacking screw 1204 above the vat. Motor 1208 may be suspended from each of the at least one supporting chambers 1204. A suitable motor for this purpose may be a variation of the Linear Actuator Model VW76AC (8 inch Stroke, 24 Total Ratio (Gear Ratio+Screw Lead) Reference), manufactured by Von Weise Gearmotors and Linear Actuators, St. Louis, Mo. Another suitable motor for this purpose may be a Model Electrak E050 (8 inch Stroke, Rating: 1.9 Amps (DC) and 24 Volts), manufactured by Warner Electric, South Beloit, Ill. Drive shaft (not shown) from motor 1208 extends into supporting chamber 1212. Jacking screw 1214 is rotatably mounted on and extending below supporting chamber 1212. Drive means (not shown) is provided for transferring rotational movement of the drive shaft to rotational movement of jacking screw 1214. Shielding sleeve 1218, which engages threads on jacking screw 1214, is provided, such that sleeve 1218 is raised or lowered by rotational movement of jacking screw 1214. Specifically, FIG. 13 depicts sleeve 1218 in a lowered position in which the underlying jacking screw 1214 is exposed. Sleeve 1218 together with the enclosure that surrounds the entire basket lifting apparatus (see FIG. 2) protect the moving parts of the apparatus fouling by splashed cooking oil and food particles. In addition, the gaskets, such as the white gaskets surrounding the sleeves in FIG. 9 also prevent debris from fouling the apparatus's moving parts. Sleeve 1218 includes a fixing means, such as nut and bolt 1220, for engaging a basket mounting hinge (not shown), e.g., basket mounting hinge 400.

In an embodiment, the drive means comprises a first gear mounted on the drive shaft and a second gear mounted on jacking screw 1214 and a drive chain rotationally engaging the gears. In another embodiment, the drive means includes a first gear mounted on the drive shaft and a second gear mounted on jacking screw 1214 and at least one communication gear for rotationally engaging the first and second gears simultaneously. Because the basket may be raised, as well as lowered, the drive means is capable of operation in either direction of rotation, and its direction of rotation may be controlled to be indifferent directions at different times.

Figure 14:
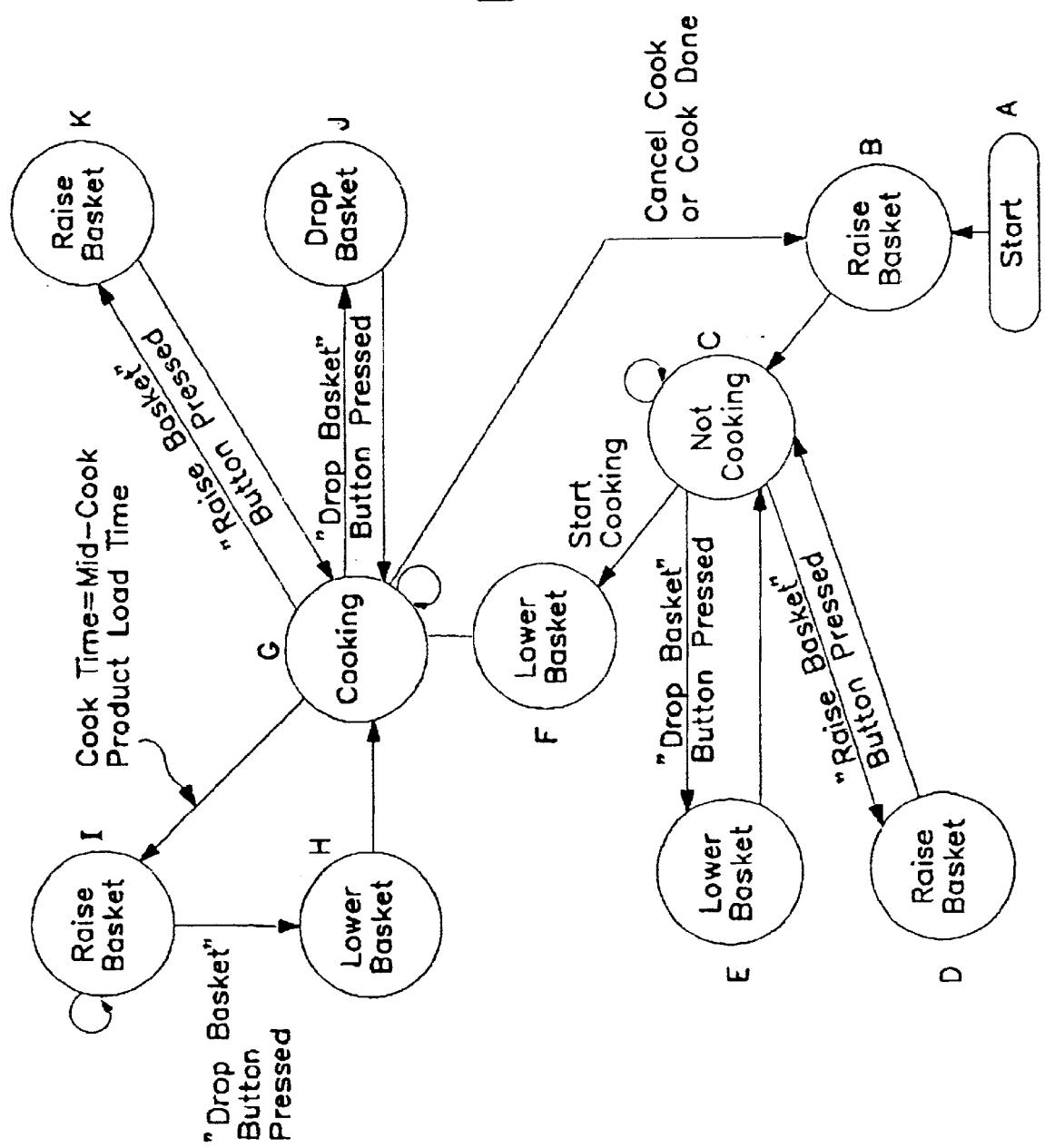
FIG. 14 is a flow chart depicting the operational logic of a cooking method using the automatic basket lifting apparatus.

Referring to FIG. 14, a state chart depicting the operational logic of a cooking method using the automatic basket lifting apparatus is provided. The chart starts in state A. In state B, the basket is raised. From state B, the system can move to state C, where the system is not cooking. From state C, the "drop basket" button can be pressed, resulting in state E, where the basket is dropped. The "raise basket" button can also be pressed, resulting in state D, where the basket is raised. The system may also continuously cycle to state C. If the system starts cooking, in state F, the basket is lowered. In state G, the system is cooking. From this state, the "drop basket" button can be pressed, resulting in state J, where the basket is dropped. The "raise basket" button can be pressed, resulting in state K. If the cook cycle is canceled, or if cooking is complete, the system may move to state B.

The automatic cooking cycle may be selected. This cycle may be selected when there are two different types of foods that are to be cooked. To use this system, first a first food product having a first cooking time and a second food product having a second cooking time are selected. The first cooking time should be greater than the second cooking time. Next, a cooking time differential between the first cooking time and the second cooking time is determined. This time differential is used to determine when the cooking basket will be raised for the second food product to be added. Next, the basket containing the first food product is lowered into a cooking medium. The first food product is cooked for the time differential, and then the basket is automatically raised. An alarm may sound to alert the user to add the second food product at this point. The second food product is added to said basket, and the basket containing both the first and second food products are lowered into the cooking medium. The first and second food products for are cooked for the second cooking time, and then the basket is raised, and the first and second food products are removed.

In another embodiment, the cooking medium may be heated to a predetermined temperature before the cooking cycle starts.

In yet another embodiment, the cooking medium may be heated to a compensation temperature, after the basket containing only said first food product is raised. The compensation temperature may be greater than the predetermined temperature, to compensate for a temperature decrease caused by the lowering of the basket containing the first and second food products.

In still another embodiment, additional time may be added to the cooking cycle for the basket containing both the first and second food products, to compensate for a temperature decrease caused by the addition of the second food product.

Figure 15:
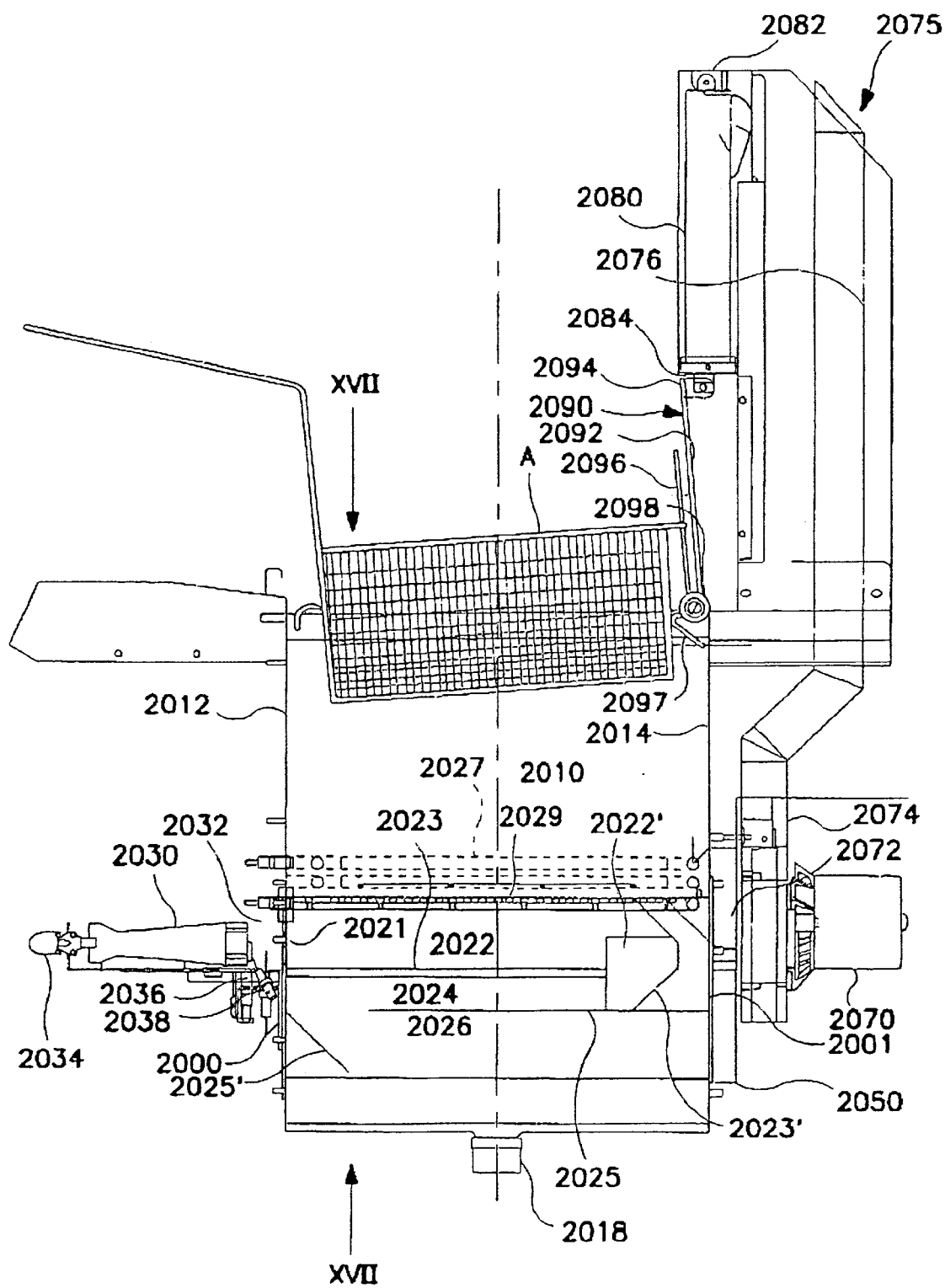
FIG. 15 is a side view of still another embodiment of the basket lifting apparatus with a modified motor assembly and basket mounting hinge.

Referring to FIG. 15, a side view of a further embodiment of the basket lifting apparatus is depicted with a modified motor assembly and basket mounting hinge. A cooking system, such as an induced draft, open fryer system, in which a burner is fired into a heat exchanger tube, from which heat is transferred to a cooking medium, such as shortening or oil, contained in a fryer vessel is known. Such a system is described in U.S. patent application Ser. No. 09/063,042, now issued as U.S. Pat. No. 6,029,053, which is incorporated herein by reference. However, the method of heating the cooking medium depicted in FIG. 15 is a combination of a fuel burner and electric heating coils. Nevertheless, the method of heating of the present invention may include fuel burner, es, gas burner, configurations; electric heating means, e.g., electric heating coils; and the like; and combinations thereof.

Referring again to FIG. 15, each first heat exchanger tube 2020 has a first upper passage 2022, a middle passage 2024, and a first lower passage 2026. First upper passage 2022 is formed by an first upper baffle 2023, which extends from a first end 2012 toward a second end 2014 and is mounted on an outer wall 2029 of first heat exchanger 2020. Middle passage 2024 and first lower passage 2026 are formed by first lower baffle 2025, which extends from second end 2014 toward first end 2012 and is mounted on an outer wall 2029 of first heat exchanger 2020. First upper passage 2022 is in communication with middle passage 2024 through a upper communication passage 2022', which is located proximately to second end 2014 and between first upper passage 2022 and middle passage 2024. Middle passage 2024 is in communication with first lower passage 2026 through a middle communication passage 2024', which is located proximately to first end 2012 and between middle passage 2024 and first lower passage 2026. An upper transition baffle 2023', e.g., a V-shaped plate made from a heat resistant material, is placed in upper communication passage 2022' to smoothly direct combustion gases from first upper passage 2022 to middle passage 2024. Similarly, a middle transition baffle 2025', e.g., a V-shaped plate made from a heat resistant material, is placed in middle communication passage 2024' to smoothly direct combustion gases from middle passage 2024 to first lower passage 2026.

The first upper and lower baffles and the transition baffles may combine to cause the combustion gases to make three passes through a fryer vessel 2010 in first heat exchanger tubes 2020. The flow path of the combustion gases through first heat exchanger 2020 is again depicted by arrows. Because of the high temperature of the combustion gases, preferably, the first upper and lower baffles are removable for cleaning, repair, or replacement and may be made of a heat resistant material, such as Incoloy 800 alloy, stainless steel 309/310, or a similar heat resistant metal.

As noted above, the combustion gases are generated by burners 2030 which are coupled to first heat exchanger tubes 2020 at their first upper passages 2022. The combustion gases enter first heat exchanger tubes 2020 at first end 2012 of fryer vessel 2010 and exit from first lower passage 2026 to collection chamber 2050 at second end 2014 of fryer vessel 2010. A gap 2032 in a range of about 1 to 1.5 cm is created between burner 2030 and first inlet 2021 of each first heat exchanger tube 2020, so that secondary air may be drawn into first upper passage 2022 and may create a laminar flow around the burner flame and combustion gases. Burner 2030 has a gas inlet orifice 2034, through which gas is supplied to burner 2030; a pilot assembly 2036 for igniting the burner flame; and a flame detector 2038 for confirming burner ignition. In addition, electric heating coils 2027 may be used to heat the cooking medium. For example suitable electric heating coils (P/N 60744) are manufactured by Watlow electric, Saint Louis, Mo.

A blower 2070 is located at second end 2014 of fryer vessel 2010 to draw combustion gases through first and second heat exchanger tubes 2020 and 2040, respectively, into a collection chamber 2050 and to vent the combustion gases to an exhaust passage 2076 in an upper housing 2076 of the apparatus. A dilution gap 160 is formed between collection chamber 2050 and the inlet side of blower 2070, for example by placing spacers (not shown) or washers (not shown) on fasteners used to connect collection chamber 2050 to the inlet side of blower 2070 Air at ambient temperature from outside of the cooking system is drawn through dilution gap 2060 by blower 2070 and mixed with combustion gases from collection chamber 2050. The combustion gases are cooled by this mixing before entering blower 2070 through blower inlet 2072. The cooled combustion gases are exhausted from blower 2070 to exhaust passage 2076 through a blower outlet 2074.

In the same structure that houses exhaust passage 2076, a motor 2080 is housed to raise and lower a basket A. Motor 2080 is mounted in this housing by means of a motor bracket 2082. Each basket A is raised or lowered by a single motor 2080. A jacking gear 2084 extends from motor 2080, and a basket mounting hinge 2090 is mounted on the lower end of jacking gear 2084 by a hinge mount 2094. Hinge 2090 includes a backing plate 2092, and a basket receiving bracket 2096 extends from backing plate 2092 and engages basket A. A deflecting lip 2097 is formed on a first edge of backing plate 2092 and aids in the upright positioning of basket A. A pair of wheels 2098 are affixed on an axle or a pair of axles mounted on and parallel to backing plate 2092, such that the wheels extend beyond and substantially perpendicular to the backing plate 2092. These wheels 2098 reduce friction between the hinge mounting bracket 2090 and side walls of the cooking apparatus and vat 2010 when basket A is raised or lowered.

Figure 16:
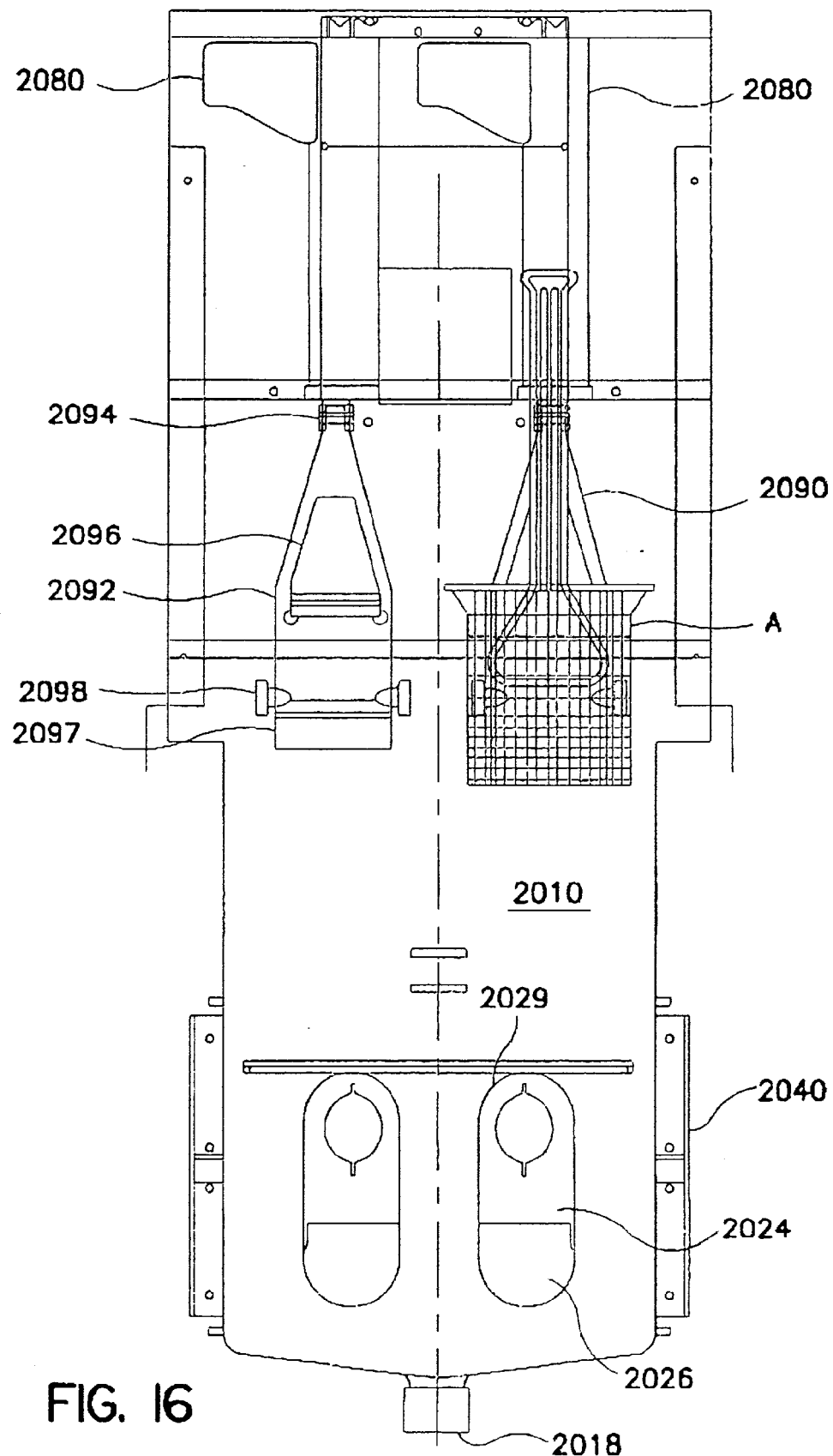
FIG. 16 is a front, cross-sectional view of the apparatus of FIG. 15 taken along line XVII—XVII. A full front view of the basket is depicted.

Referring to FIG. 16, a front, cross-sectional view of the apparatus of FIG. 15 taken along line XVII—XVII is depicted However, a full front view of basket A is depicted. The apparatus has two hinge mounting brackets 2090 for receiving two baskets A. Motors 2080 may be controlled independently to raise and lower baskets A. In FIG. 16, hinge 2090 is shown to include a tapered extension between the rectangular portion of backing plate 2092 and hinge mount 2094.

Figure 17:
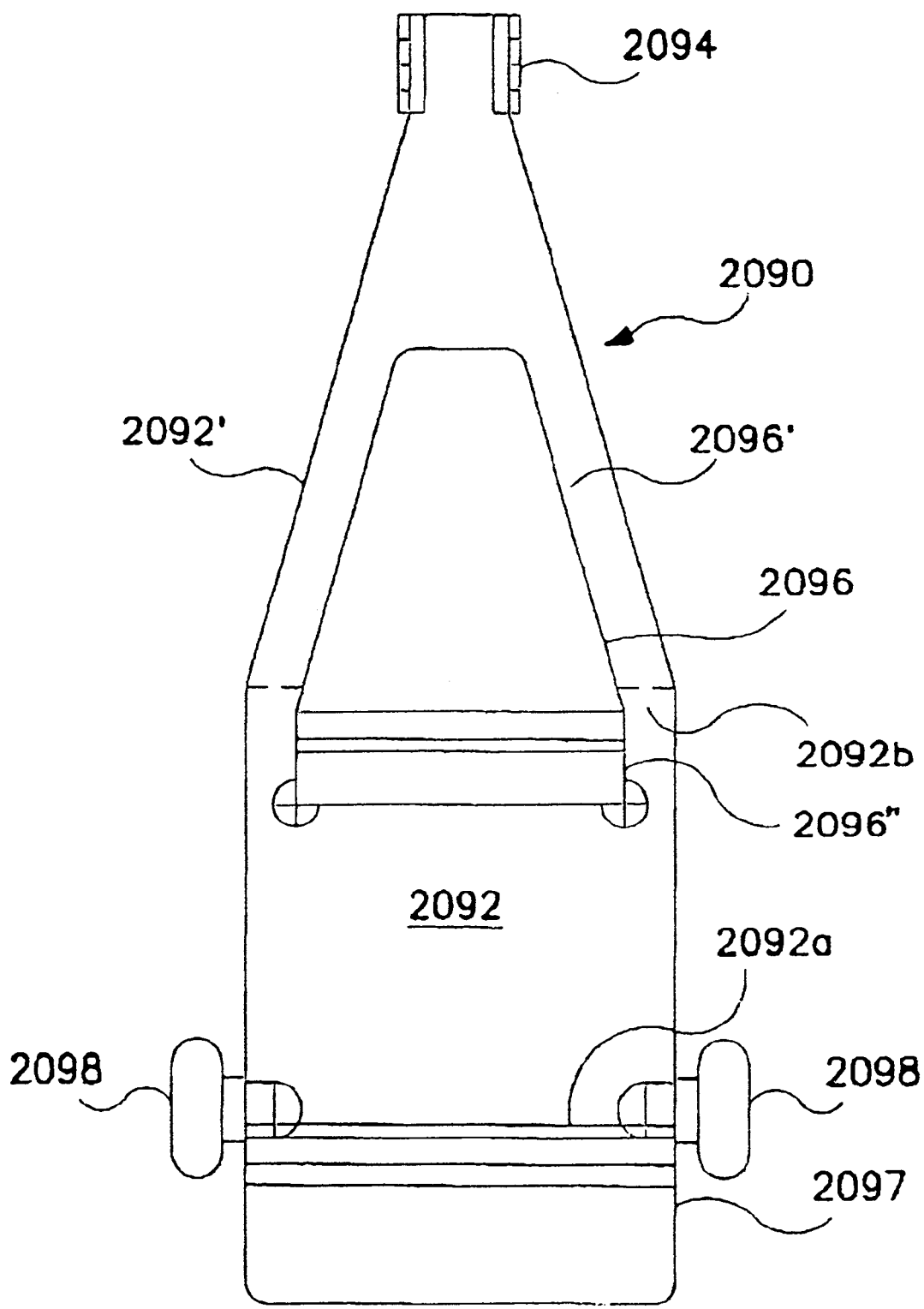
FIG. 17 is a plan view of still another embodiment of the basket mounting hinge.
Figure 18:
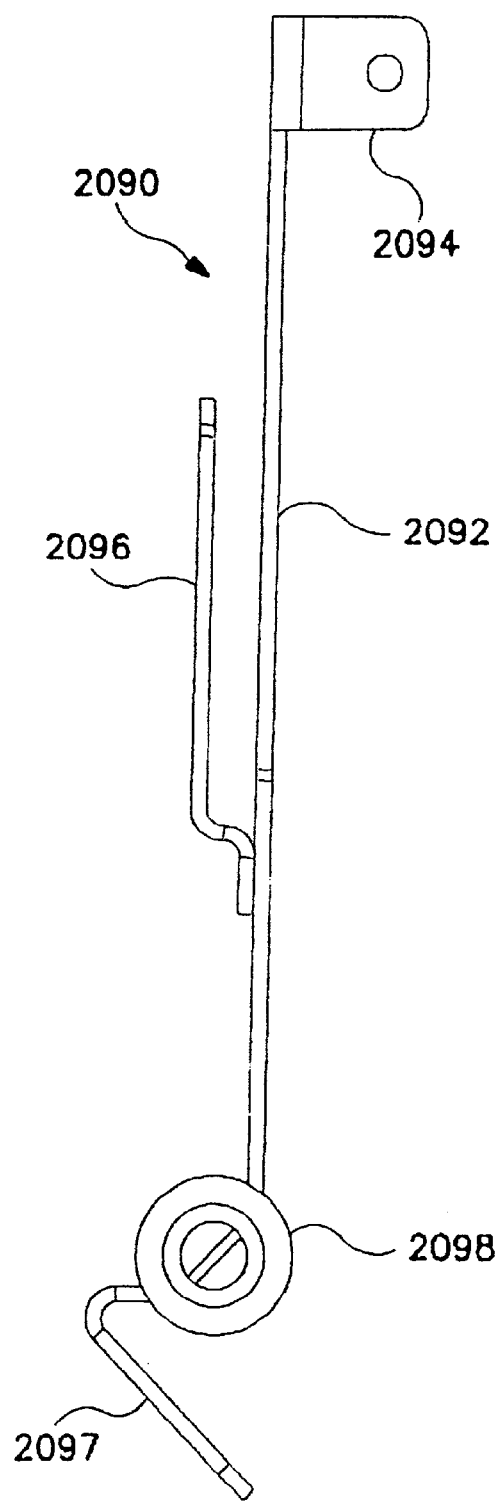
FIG. 18 is a side view of the basket mounting hinge of FIG. 17.

In FIG. 17, a plan view of this embodiment of the basket mounting hinge is shown. Hinge 2090 comprises a rectangular backing plate 2092 having first and second opposing surfaces, a tapered extension 2092', and deflecting lip 2097. Deflecting lip 2097 is formed on a first edge 2092a of backing plate 2092 and extends from the first opposing surface. Basket receiving bracket 2096 has a first portion 2096" fixed to and extending from the first opposing surface and a second tapering portion 2096' extending substantially parallel to the first opposing surface. Second tapering portion may be adapted to receive one end of a basket and to support a basket. The tapering extension 2092' is formed on a second edge 2092b, and at least one hinge mount 2094, es, a U-shaped bracket suitable for receiving a bolt, a screw, or a locking pin, is positioned proximate to a narrowest portion of tapering extension 2092' for fixing hinge 2090 to a basket lifting apparatus. Each of a pair of wheels 2098 is affixed on an axle mounted parallel to the first opposing surface, such that wheels 2098 extend beyond and substantially perpendicular to the second opposing surface. Alternatively, both wheels 2098 may be fixed to a single axle or each may be affixed to its own axle. Referring to FIG. 18, a side view of basket mounting hinge 2090 of FIG. 17 is depicted.

Figures 1, 19:
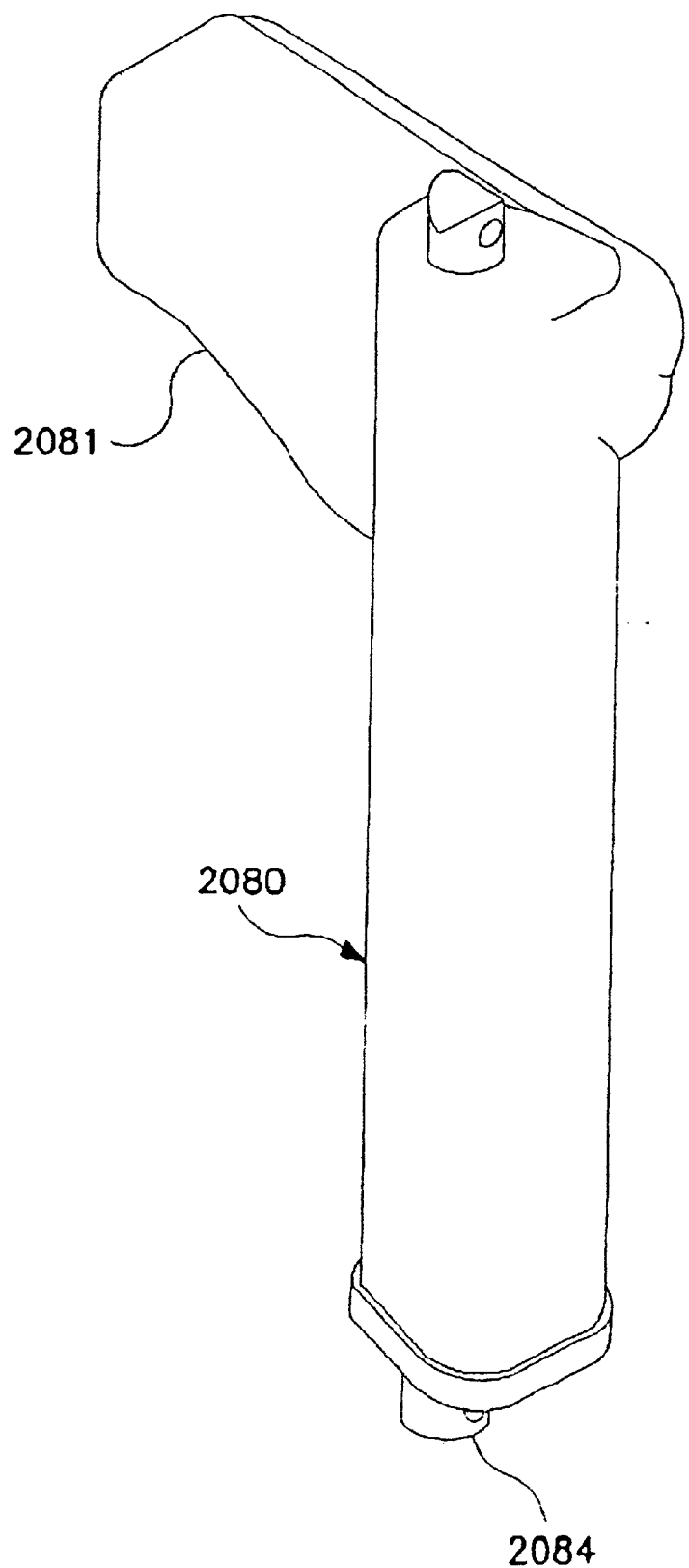
Figures 2, 19:
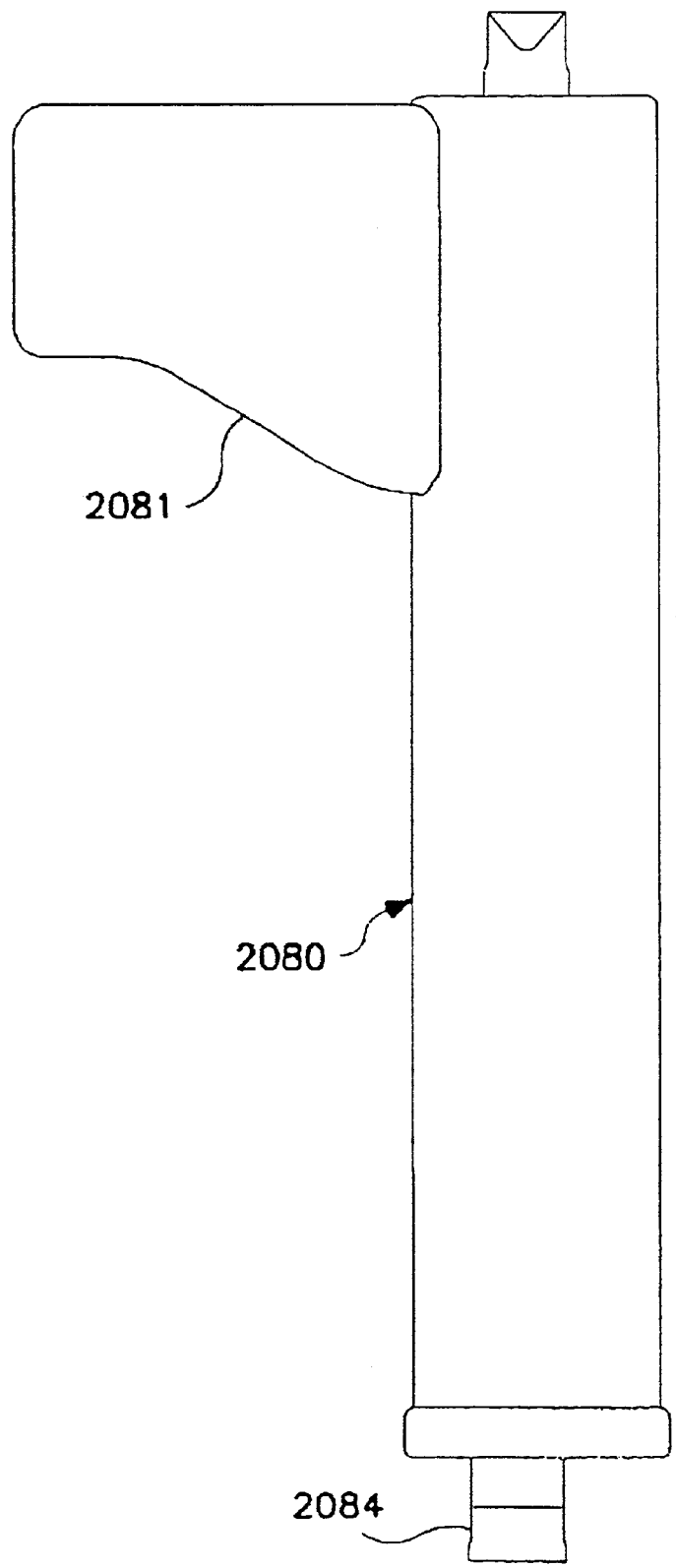
Figures 3, 19:
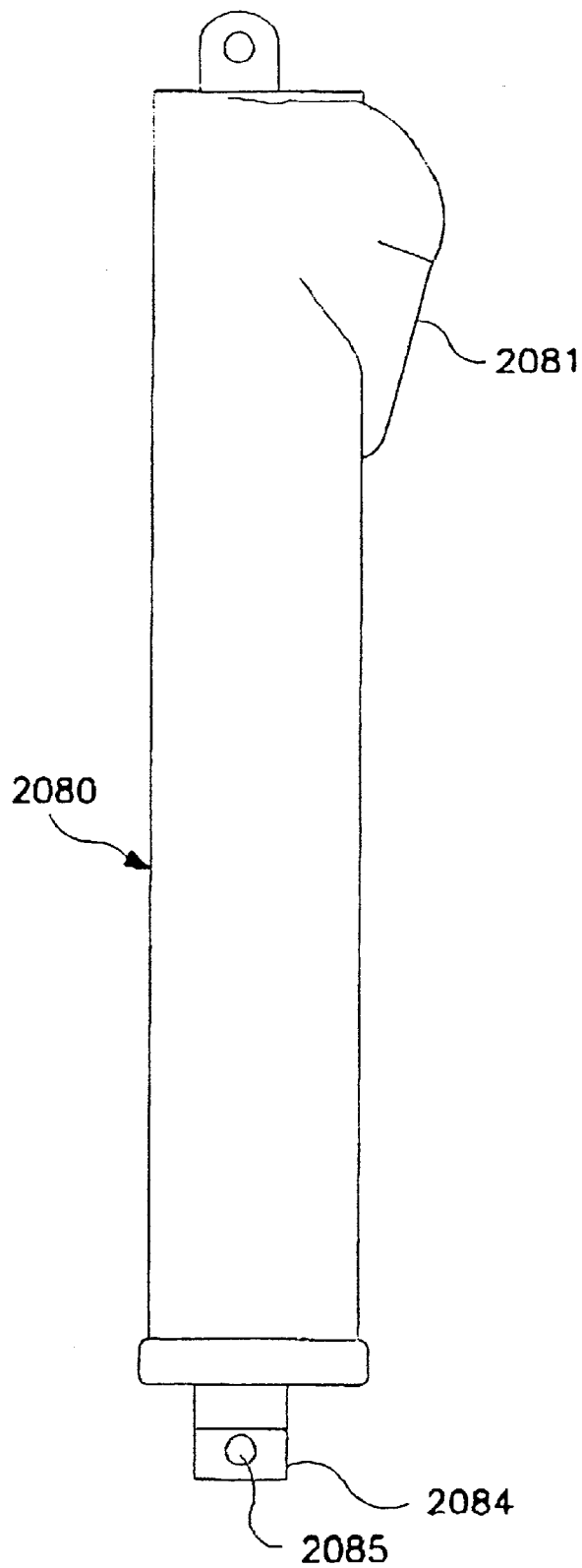

In FIGS. 19-1, 19-2, and 19-3, three views of motor 2080 for the embodiment of the apparatus of FIG. 15 are shown. Referring to FIG. 15-1, a perspective view of motor 2080 is depicted. Jacking gear 2084 is shown extending from beneath motor 2080 and a stabilizing arm is shown extending from the left side of motor 2080. In this embodiment, motor 2080 is a Model Electrak E050 (8 inch Stroke, Rating: 1.9 Amps (DC) and 24 Volts), manufactured by Warner Electric, South Beloit, Ill. Similarly, FIG. 19-2 is a front view of motor 2080, and FIG. 19-3 is a right side view of motor 2080. In FIG. 19-3, a hole 2085 is bored through the lower end of jacking gear 2084. Hole 2085 is configured to receive a bolt, a screw, or a locking pin to secure hinge mount 2094 to jacking gear 2094. As can be seen in each of these figures, motor 2080 is completely enclosed in order to protect the motor's components from airborne droplets of the cooking medium, dust, and food particles.

Figures 2, 20:
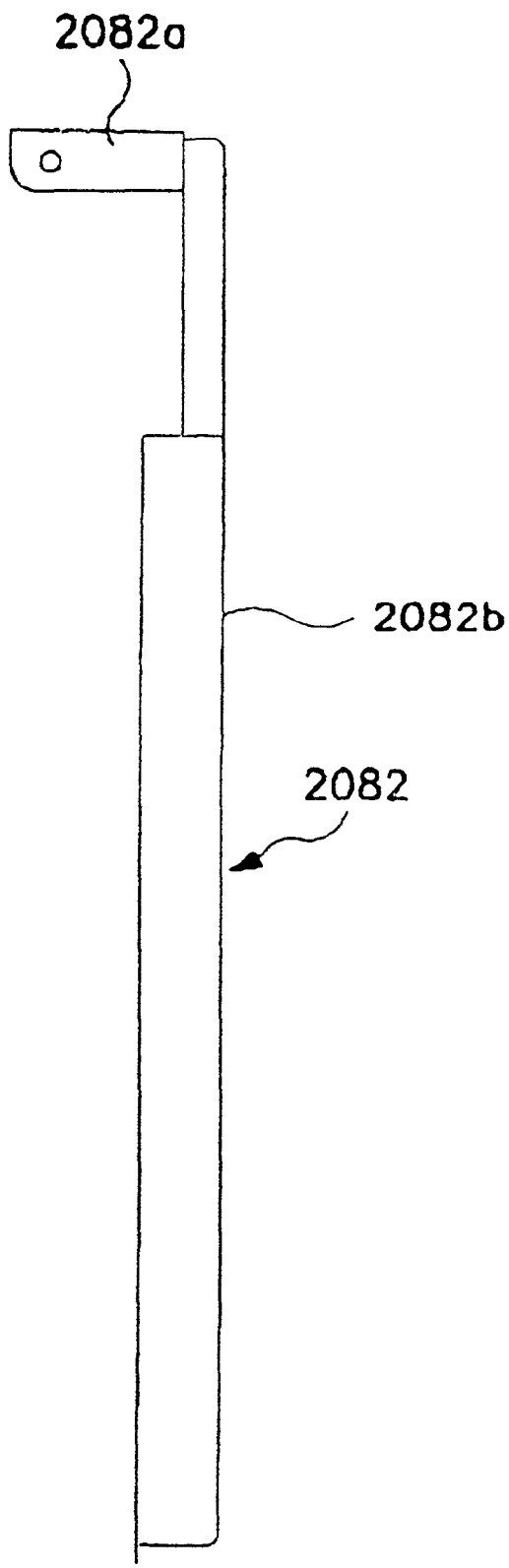
Figures 3, 4, 20:
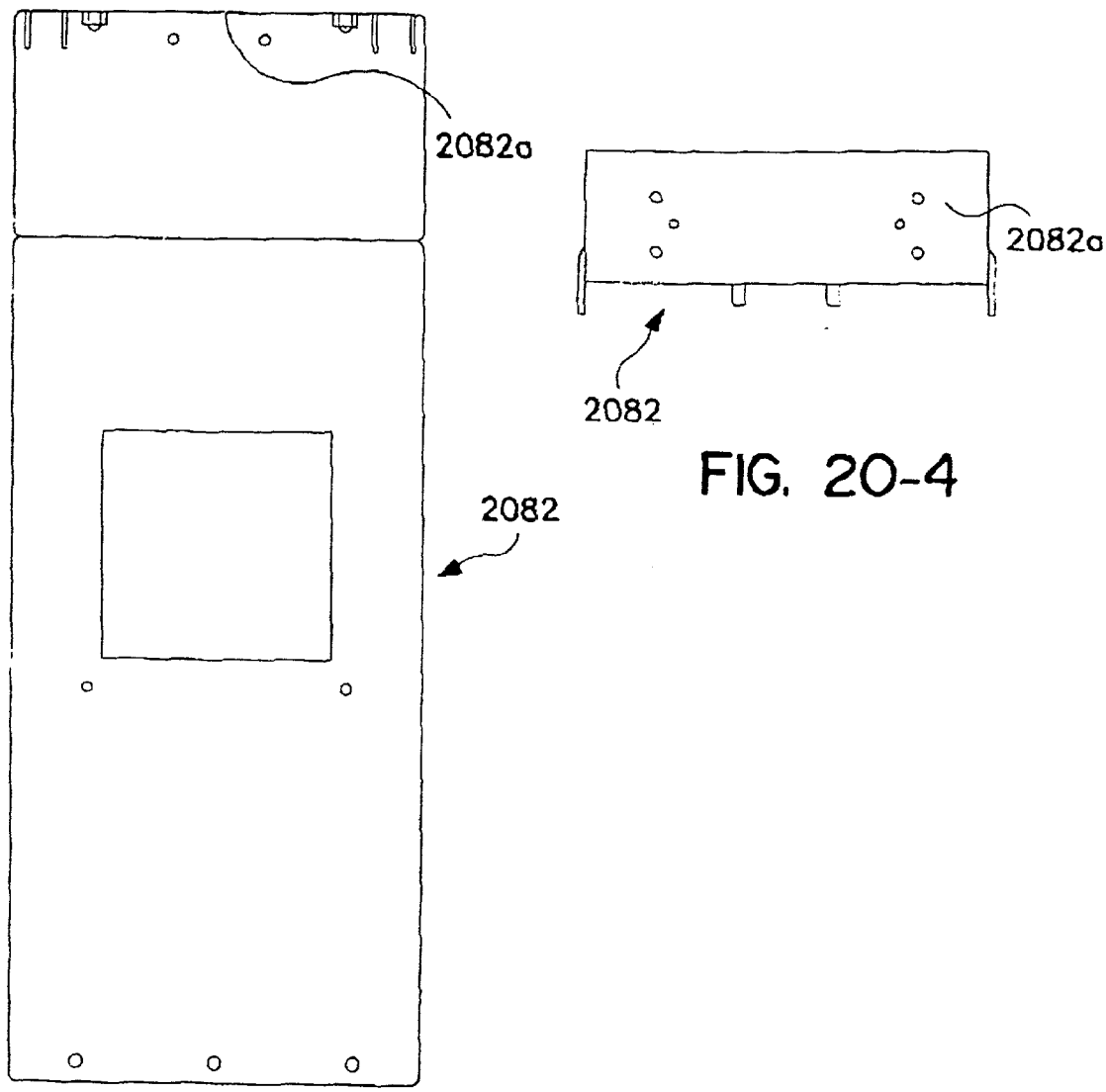

Referring to FIGS. 20-1, 20-2, 20-3, and 20-4, four views of motor mounting bracket 2082 of the embodiment of the invention shown in FIG. 15 are depicted. FIG. 20-1 is a perspective view of motor mounting bracket 2082. Bracket 2082 includes a top portion 2082a from which motor 2080 is suspended and a rear surface 2082b, which may be welded or bolted to the upper housing 2075 of the apparatus. Similarly, FIG. 20-2 is a right side view of motor mounting bracket 2082; FIG. 20-3 is a front view of motor mounting bracket 2082; and FIG. 20-4 is a view of top portion 2082a of motor mounting bracket 2082. Because motor 2080 may be lightweight, motor mounting bracket 2082 also may be lightweight. The use of such lightweight motors reduces or eliminates the stresses placed on upper housing 2075 of the apparatus when baskets A are raised or lowered.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A basket mounting hinge comprising:
   a rectangular backing plate having first and second opposing surfaces;
   a deflecting lip formed on a first edge of said backing plate and extending from said first opposing surface;
   a basket receiving bracket having a first portion fixed to and extending from said first opposing surface and a second portion extending substantially parallel to said first opposing surface, wherein said second portion is adapted to receive and support a basket;
   at least one mounting means positioned proximate to a second edge of said backing plate for fixing said hinge to a basket lifting apparatus; and
   a pair of wheels, each affixed on an axle mounted parallel to said first opposing surface, wherein said wheels extend beyond and substantially perpendicular to said second opposing surface.

2. The hinge of claim 1, wherein said mounting means is a hole for receiving a fixing bolt.

3. A basket mounting hinge comprising:
   a pair of angled, substantially parallel hinge brackets forming an angled bracket portion and a vertical bracket portion, each of said brackets having a securing means at a first bracket end for fixing said hinge to a basket lifting apparatus;
   a bracket joining plate having first and second opposing surfaces and subtending said angle of said brackets to form an angled plate portion and a vertical plate portion;
   a deflecting lip fixed to a second bracket end of each of said brackets and extending between said brackets; and
   a basket receiving bracket having a first portion fixed to and extending from said first opposing surface of said vertical plate portion and a second portion extending substantially parallel to said first opposing surface of said vertical plate portion, wherein said second portion is adapted to receive and support a basket.

4. The hinge of claim 3, wherein said securing means comprises a loop for receiving a securing pin.

5. A basket lifting apparatus comprising:
   a supporting beam mounted substantially perpendicular and adjacent to an upper rear edge of a vat;
   at least one supporting chamber extending perpendicular to said supporting beam and above and parallel to said upper rear edge of said vat;
   a motor suspended from each of said at least one supporting chambers, wherein a drive shaft from said motor extends into said supporting chamber;
   a jacking screw rotatably mounted on and extending below said supporting chamber;
   drive means for transferring rotational movement of said drive shaft to rotational movement of said jacking screw; and
   a shielding sleeve, which engages threads on said jacking screw, such that said sleeve is raised or lowered by said rotational movement of said jacking screw, said sleeve including fixing means for engaging a basket mounting hinge.

6. The apparatus of claim 5, wherein said hinge comprises:
   a rectangular backing plate having first and second opposing surfaces;
   a deflecting lip formed on a first edge of said backing plate and extending from said first opposing surface;
   a basket receiving bracket having a first portion fixed to and extending from said first opposing surface and a second portion extending substantially parallel to said first opposing surface, wherein said second portion is adapted to receive and support a basket;
   at least one mounting means positioned proximate to a second edge of said backing plate for fixing said hinge to a basket lifting apparatus by said fixing means; and
   a pair of wheels, each affixed to on an axle mounted parallel to said first opposing surface, wherein said wheels extend beyond and substantially perpendicular to said second opposing surface.

7. The apparatus of claim 5, wherein said hinge comprises:
- a pair of angled, substantially parallel hinge brackets forming an angled bracket portion and a vertical bracket portion, each of said brackets having a securing means at a first bracket end for fixing said hinge to a basket lifting apparatus by said fixing means;
- a bracket joining plate having first and second opposing surfaces and subtending said angle of said brackets to form an angled plate portion and a vertical plate portion;
- a deflecting lip fixed to a second bracket end of each of said brackets and extending between said brackets; and
- a basket receiving bracket having a first portion fixed to and extending from said first opposing surface of said vertical plate portion and a second portion extending substantially parallel to said first opposing surface of said vertical plate portion, wherein said second portion is adapted to receive and support a basket.

8. The apparatus of claim 5, wherein said drive means for transferring rotational movement comprises a first gear mounted on said drive shaft and a second gear mounted on said jacking screw and a drive chain rotationally engaging said gears.

9. The apparatus of claim 5, wherein said drive means for transferring rotational movement comprises a first gear mounted on said drive shaft and a second gear mounted on said jacking screw and at least one communication gear for rotationally engaging said first and second gears.

10. A method for controlling an automatic basket lifting apparatus, comprising the steps of:
- selecting a first food product having a first cooking time and a second food product having a second cooking time, wherein the first cooking time is greater than the second cooking time;
- determining a cooking time differential between the first cooking time and the second cooking time;
- lowering a basket containing the first food product into a cooking medium;
- cooking said food product for said cooking time differential;
- raising said basket;
- adding said second food product to said basket;
- lowering said basket containing said first and second food products into a cooking medium;
- cooking said first and second food products for said second cooking time; and
- raising said basket and removing said first and second food products.

11. The method of claim 10, further comprising the step of heating said cooking medium to a predetermined temperature.

12. The method of claim 11, further comprising the step of heating the cooking medium to a compensation temperature, after the step of raising said basket containing only said first food product, such that said compensation temperature is greater than said predetermined temperature, to compensate for a temperature decrease caused by the lowering of said basket containing said first and second food products.

13. The method of claim 10, further comprising the step of delaying the raising of said basket containing the first and second food products, after the step cooking said first and second food products for said second cooking time, to compensate for a temperature decrease caused by the lowering of said basket containing said first and second food products.

14. A basket mounting hinge comprising:
- a rectangular backing plate having first and second opposing surfaces;
- a deflecting lip formed on a first edge of said backing plate and extending from said first opposing surface;
- a tapered extension, wherein said tapering extension extends from a second edge of said backing plate;
- a basket receiving bracket having a first portion fixed to and extending from said first opposing surface and a second tapering portion extending substantially parallel to the first opposing surface, wherein said second tapering portion is adapted to receive and support a basket;
- at least one mounting means positioned proximate to a narrowest portion of said tapering extension for fixing said hinge to a basket lifting apparatus; and
- a pair of wheels, each affixed on an axle mounted parallel to said first opposing surface, wherein said wheels extend beyond and substantially perpendicular to said second opposing surface.

15. The hinge of claim 14, wherein said at least one mounting means is a U-shaped bracket suitable for receiving a bolt.

* * * * *

UNITED STATES PATENT AND TRADEMARK OFFICE
CERTIFICATE OF CORRECTION

PATENT NO. : 6,322,831 B1  
DATED : November 27, 2001  
INVENTOR(S) : Ned M. Mote et al.

Page 1 of 1

It is certified that error appears in the above-identified patent and that said Letters Patent is hereby corrected as shown below:

Title page,
Item [60], U.S. PATENT DOCUMENTS, delete "60/128,214, filed on Apr. 7, 1999" and insert therefore -- 60/182,214, filed on Feb. 14, 2000 --.

Column 1,
Line 8, delete "Apr. 7, 1999" and replace with -- Feb. 14, 2000 --.

Signed and Sealed this

Sixteenth Day of April, 2002

Attest:

Attesting Officer

JAMES E. ROGAN
*Director of the United States Patent and Trademark Office*